(12) United States Patent
Begole et al.

(10) Patent No.: US 7,974,849 B1
(45) Date of Patent: Jul. 5, 2011

(54) DETECTING AND MODELING TEMPORAL COMPUTER ACTIVITY PATTERNS

(75) Inventors: James M. Begole, Mountain View, CA (US); Rosco Hill, Montreal (CA)

(73) Assignee: Oracle America, Inc., Redwood City, CA (US)

( * ) Notice: Subject to any disclaimer, the term of this patent is extended or adjusted under 35 U.S.C. 154(b) by 1879 days.

(21) Appl. No.: 10/443,176

(22) Filed: May 21, 2003

Related U.S. Application Data

(63) Continuation-in-part of application No. 10/217,924, filed on Aug. 12, 2002, now abandoned.

(51) Int. Cl.
*G06Q 10/00* (2006.01)
(52) U.S. Cl. .......... 705/1.1; 705/8; 705/9; 709/224; 714/37
(58) Field of Classification Search ............ 705/1.1, 705/8, 9, 10; 709/224; 714/37
See application file for complete search history.

(56) References Cited

U.S. PATENT DOCUMENTS

| | | | | |
|---|---|---|---|---|
| 5,831,611 | A * | 11/1998 | Kennedy et al. | 715/763 |
| 5,960,173 | A * | 9/1999 | Tang et al. | 709/201 |
| 6,006,215 | A * | 12/1999 | Retallick | 1/1 |
| 6,151,582 | A * | 11/2000 | Huang et al. | 705/8 |
| 6,275,977 | B1 * | 8/2001 | Nagai et al. | 717/104 |
| 6,282,514 | B1 * | 8/2001 | Kumashiro | 705/7 |
| 6,519,571 | B1 * | 2/2003 | Guheen et al. | 705/14.66 |
| 6,658,287 | B1 * | 12/2003 | Litt et al. | 600/544 |
| 2002/0099597 | A1 * | 7/2002 | Gamage et al. | 705/10 |
| 2002/0152033 | A1 * | 10/2002 | Beavis et al. | 702/19 |
| 2002/0152120 | A1 * | 10/2002 | Howington | 705/14 |
| 2003/0046026 | A1 * | 3/2003 | Levy et al. | 702/181 |

OTHER PUBLICATIONS

Horvitz, E. "Coordinate: Probabilistic Forecasting of Presence and Availability", Proceedings of the 18th Conference on Uncertainty and Artificial Intelligence, Edmonton Alberta, Jul. 2002. Morgan Kaufmann Publishers, pp. 224-233.*
Zerubavel, Eviatar, "Hidden Rhythms", Schedules and Calendars in Social Life, Chicago: The University of Chicago Press, 1981.*
Del Negro, C. "Periodicity, . . . Rhythm-Generating Neural Network", Biophysical Journal, vol. 82, Jan. 2002, pp. 206-214.*
Brian Clarkson and Alex Pentland; "Predicting Daily Behavior Via Wearable Sensors"; {clarkson, sandy}@media.mit.edu; pp. 1-8.
Jon Orwant; "Doppelganger Goes to School: Machine Learning for User Modeling"; 1993 Massachusetts Institute of Technology; pp. 1-88.
Eric Horvitz, Paul Koch, Carl M. Kadie and Andy Jacobs; "Coordinate: Probabilistic Forecasting of Presence and Availability"; Microsoft Research, Redmond, WA; {horvitz, paulkoch, carlk, andyj}@microsoft.com.

(Continued)

*Primary Examiner* — Tan Dean D Nguyen
(74) *Attorney, Agent, or Firm* — Martine Penilla & Gencarella, LLP

(57) ABSTRACT

A method is described with which to detect and model a person's temporal activity patterns from a record of the persons computer activity or online presence. The method is both predictive and descriptive of temporal features and is constructed with a minimal amount of beforehand knowledge. Activity related data is accumulated from a mechanism that is involved in the activity of a person. Significant inactivity features are identified within the activity data. These inactivity features are characterized so as to project the temporal activity of the person. Real-time activity of the person is then detected and inactivity periods are checked for likelihood of belonging to a previously characterized significant feature. The resulting information is formatted and made available to individuals having a need for the information.

24 Claims, 31 Drawing Sheets

OTHER PUBLICATIONS

Scott E. Hudson, James Fogarty, Christopher G. Atkeson, Jodi Forlizzi, Sara Kielser, Johnny C. Lee and Jie Yang; Predicting Human Interruptibility With Sensors: A Wizard of Oz Feasibility Study; HCI Institute, Robotics Institute, and School of Design, Carnegie Mellon University, Pittsburgh, PA; {scott.hudson, jfogarty, cga, forlizzi, kiesler, jie_yang}@cs.cmu.edu; pp. 1-8..

* cited by examiner

100D

```
┌─────────────────────────────────────────────┐
│  COLLECT DATA ON COMPUTER AND OTHER ACTIVITY,│
│      COMMUNICATIONS ACTIVITY, ETC.          │
│                  110D                        │
└─────────────────────────────────────────────┘
                      ↓
┌─────────────────────────────────────────────┐
│              ANALYZE ACTIVITY                │
│                  120D                        │
└─────────────────────────────────────────────┘
                      ↓
┌─────────────────────────────────────────────┐
│        ANALYZE IDLE AND ACTIVE PERIODS       │
│                  130D                        │
└─────────────────────────────────────────────┘
                      ↓
┌─────────────────────────────────────────────┐
│  APPLY ANALYTICAL RESULTS TO COORDINATE COMMUNICATIONS, │
│    MANAGE TIME, SCHEDULE COMPUTER AND COMMUNICATIONS    │
│  MAINTENANCE, SCHEDULE BREAKS NECESSARY TO PREVENT STRESS│
│    AND INJURY, SET APPOINTMENT ALARMS AND NOTICES, ETC. │
│                       140D                              │
└─────────────────────────────────────────────┘
```

```
┌─────────────────────────────────────────────────────────────┐
│ EXAMINE IDLE PERIODS OCCURING BETWEEN 1ST AND LAST ACTIVE   │
│                     PERIODS OF A DAY                         │
│                           701                                │
└─────────────────────────────────────────────────────────────┘
                              │
                              ▼
┌─────────────────────────────────────────────────────────────┐
│     CALCULATE FREQUENCY OF IDLE PERIODS OF EACH DURATION    │
│                           702                                │
└─────────────────────────────────────────────────────────────┘
                              │
                              ▼
┌─────────────────────────────────────────────────────────────┐
│           PLOT DISTRIBUTION OF FREQUENCIES OF IDLENESS      │
│                           703                                │
└─────────────────────────────────────────────────────────────┘
                              │
                              ▼
┌─────────────────────────────────────────────────────────────┐
│   COMPARE WITH REAL-TIME INFORMATION OF DURATION OF PRESENT │
│                          IDLENESS                            │
│                           704                                │
└─────────────────────────────────────────────────────────────┘
                              │
                              ▼
┌─────────────────────────────────────────────────────────────┐
│     ESTIMATE TIME OF LIKELY RETURN FROM PERIOD OF IDLENESS  │
│                           705                                │
└─────────────────────────────────────────────────────────────┘
```

```
┌─────────────────────────────────────────────────────────┐
│  EXAMINE ACTIVE PERIODS OCCURING BETWEEN 1ST AND LAST IDLE │
│                    PERIODS OF A DAY                      │
│                         761                              │
└─────────────────────────────────────────────────────────┘
                            │
                            ▼
┌─────────────────────────────────────────────────────────┐
│      CALCULATE FREQUENCY OF ACTIVE PERIODS OF DURATION   │
│                         762                              │
└─────────────────────────────────────────────────────────┘
                            │
                            ▼
┌─────────────────────────────────────────────────────────┐
│         PLOT DISTRIBUTION OF FREQUENCIES OF ACTIVITY     │
│                         763                              │
└─────────────────────────────────────────────────────────┘
                            │
                            ▼
┌─────────────────────────────────────────────────────────┐
│  COMPARE WITH REAL-TIME INFORMATION OF DURATION OF PRESENT│
│                        ACTIVITY                          │
│                         764                              │
└─────────────────────────────────────────────────────────┘
                            │
                            ▼
┌─────────────────────────────────────────────────────────┐
│    ESTIMATE TIME OF LIKELY END OF CURRENT PERIOD OF ACTIVITY│
│                         765                              │
└─────────────────────────────────────────────────────────┘
```

FIGURE 7D

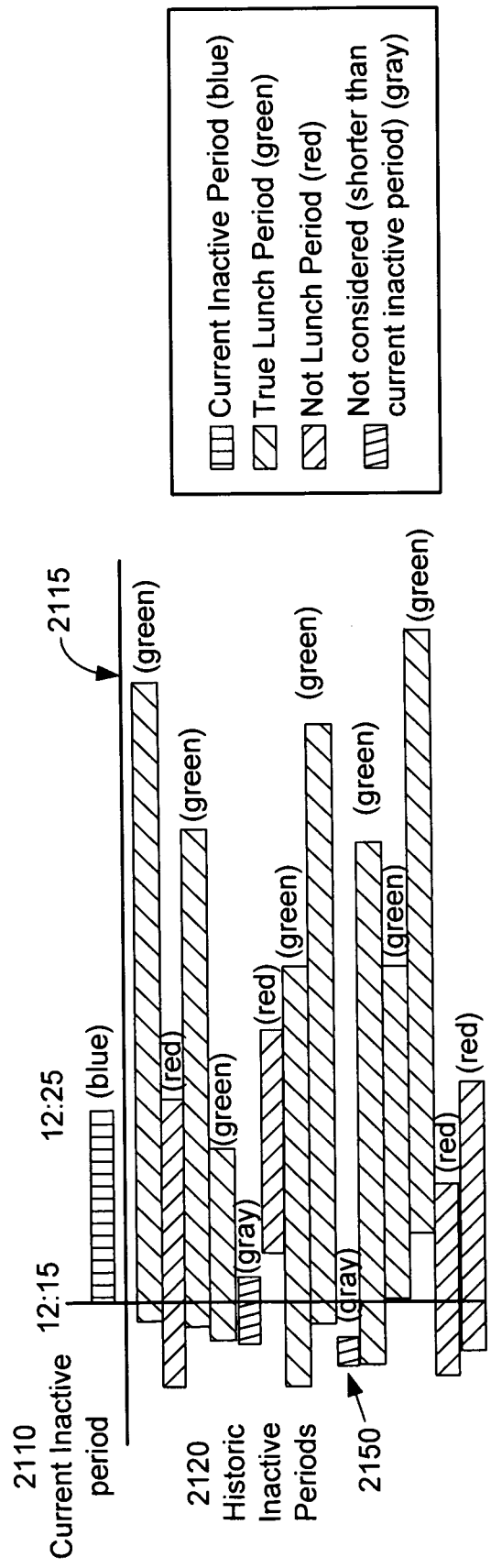

DETECTING AND MODELING TEMPORAL COMPUTER ACTIVITY PATTERNS

RELATED UNITED STATES APPLICATION

This patent application is a continuation-in-part of U.S. patent application Ser. No. 10/217,924, filed on Aug. 12, 2002, and entitled "Method and System for Inferring and Applying Coordination Patterns from Individual Work and Communication Activity", by James M. A. Begole, et al., and assigned to the assignee of the present invention, now abandoned, which is incorporated herein by reference.

FIELD OF THE INVENTION

Embodiments of the present invention relate to the general field of detecting and projecting information regarding human behavior, including awareness within distributed work groups. More particularly, embodiments of the present invention provide a method for detecting presence within an electronic space and predicting an activity.

BACKGROUND ART

People working together in traditional workgroups at a single worksite, or perhaps a few closely neighboring worksites, receive many cues about each other's availability and communications preferences by direct observation, inquiry, and experimentation. In such co-located workgroups, people learn by such cues when co-workers generally arrive, leave, and take breaks and meals, whether they are present in their office, busily working, attending a meeting, talking on the telephone, and other activities and conditions.

Co-located colleagues thus have many cues to know when colleagues are most likely available and unavailable for intercommunication, and what modes of communication are best for interacting with them. Members of traditional co-located workgroups frequently make accurate assumptions based on such cues and thus, with a shared sense of collegial time, to interact effectively with co-workers. However, recent developments in work life have made it harder to have such a shared sense of time among colleagues.

Flexible work hours, long commutes, and other factors have contributed to less uniform work hours among colleagues. Additionally, more people are also telecommuting (e.g., working from their home), working from satellite work sites, and even working from mobile locations while traveling or using laptop computers and/or handheld devices. Besides these developments, the growth of networking technologies and recent trends in increasing distributed siting of work forces exacerbates the problem. Further, the growth of networking is promoting more groups of people increasingly working together from different locations as distributed groups.

Many modern work groups are distributed across geographical sites, which makes them physically remote. Such distributed work sites may be so remote from each other they are perhaps shifted across time zones. Globalization complicates this even further, with members of the same work group on different continents and separated by large shifts in time, such as some members experiencing night while others are experiencing day. Under such circumstances, cultural factors may also complicate the situation.

All of these factors make it harder for work groups to have a shared awareness of the temporal rhythms and work habits of their colleagues. Being distributed across space and time zone and the concomitant disruption of shared work rhythm awareness can make it harder for group members to coordinate their activities and find opportune times to contact each other. Distributed and mobile co-workers do not receive cues that members of co-located groups routinely share. Thus, distributed and mobile co-workers lack the information provided, for example, by the cues co-located colleagues use to determine when and with what media to best contact remote colleagues.

The information regarding when and with what media to best contact distant or remote colleagues is not limited in usefulness to coworkers who are known to each other. Another problem faced in the modern work place is initiating contact with a person the initiator has not yet met, or with whom the initiator is unfamiliar. Initiating contact with such an unfamiliar person can be awkward because the initiator may lack sufficient information about the unfamiliar person's availability and/or their preference for and responsiveness to the variety of possible communication media. The lack of information on the preference for and responsiveness to the variety of possible communication media may be aggravated by variables such as time of day, relationship to sender, message priority, and others.

Conventional approaches to providing information regarding collegial time, presence, and communication preferences to distributed coworkers includes the use of video, audio, snapshots, and more recently Web-based cameras (Webcams) to provide shared awareness for distributed work groups. However, initializing such contacts remains problematic, because such virtual presence techniques still suffer from time sensitivity issues shared by distributed work groups.

The use of some recent technologies have helped restore some awareness cues for work groups. For one example, audio, visual, and gyro sensors have been proposed as wearable input sources for memory prosthesis and/or electronic journals. This technique allows the detection of significant changes in scene. However, these techniques are proposed for individuals.

Another example is the predicting one's mental "state of availability", that is, how receptive they might be to being interrupted, based on "machine learning" algorithms. This technique employs the accumulation of data that will be internally analyzed and a "yes" or "no" answer may be provided in response to asking a question regarding the state of the data. However, the state of the model is hidden or internalized and not apparent in this technique.

For another example, on-line calendars have come into widespread use and sharing group access to each other's calendars plays a role in coordinating group activities. However, impromptu and ad hoc calendar changes may not be fully promulgated to the rest of the work group rapidly enough to provide the needed information. Instant messaging (IM) at work has helped restore some sense of awareness among distributed workers, and made it easier to establish contact with each other. However, IM requires both parties be on-line simultaneously to effectuate intercommunication between them.

Previous research has been performed using Bayesian networks that include time along with other factors to construct models of a person's likely location or availability. While a Bayesian network can show factors that might contribute to a prediction, it does not describe changes in a factor's influence over time.

One problem with the conventional art is that scheduling and initiating contact is subject to the same time sensitivity issues confronting distributed workgroups in general. Specifically, when is the best time and what is the most promising communications medium to use to reach another person to schedule time together or by which to initiate contact? Another problem with the conventional art is that some conventional techniques are subject to being rendered ineffective or inaccurate by impromptu or ad hoc schedule changes which may not be sent in a timely manner to all group members relying on the information. The conventional art is also problematic because many rhythmic patterns do not conform to common parametric statistical distributions used to construct predictive models.

SUMMARY OF THE INVENTION

Embodiments of the present invention are directed to a method and system for generating models of recurring regions of inactivity that are based on presence information gathered for an individual at a particular location, e.g., the office. A second embodiment of the present invention is directed to a method and system for using the generated models to predict if an individual is within one of the models when he/she is currently inactive. This information may also be used to predict when the individual is expected to return. Both of these embodiments are further discussed below.

Presence information may be gathered from any source indicating the individual's presence at the location. In one embodiment, interaction with a computer keyboard and mouse are used. Interaction with a telephone, instant messaging activity, or interaction with any office device can also be used to generate presence information. Presence information may also be gathered from any of a number of presence sensing devices. Presence information is used to generate activity data indicating activity or inactivity over time for a specific date for a specific location. This daily activity data is then stored in a an activity database and categorized by day of the week and location.

In one embodiment, a novel method and system are described for analyzing the activity database and for automatically generating models of features of inactivity therefrom. In one embodiment, a model of a feature of inactivity is based on a particular day of the week, e.g., Monday. According to this process, activity data for many Mondays are compiled for a particular individual at a particular location. From these daily records, a probability is generated for Monday that indicates the probability that the individual is active over the duration of the day. The more activity found in the daily records for a given time, then the higher probability that the individual is active for that given time. A minimum threshold and a maximum threshold are applied to the probability data to locate features of inactivity ("candidates") that are defined as periods transitioning below the minimum threshold and rising above the maximum threshold. The threshold values are adjusted to eliminate insubstantial periods of inactivity. At this point, the identified periods of inactivity are defined by a start point, an end point and a duration.

For each period of inactivity identified above (feature candidate), the database of daily records is searched for the selected day, e.g., Monday. Periods of inactivity in these daily records are examined to determine if they are "close" to the feature candidate. A period of inactivity is close if its start-time, end-time and duration are within some number of standard deviations from the same characteristics of the feature candidate. If the period of inactivity is "close" to the feature candidate, then it is said to be a "feature instance." The above is performed to locate many feature instances and then separate probability distributions are constructed based on the identified start-times, end-times and durations of the feature instances. The feature is given a name that may correlate with a recognized event that happens coincidentally with the feature, e.g., "lunch," or "staff meeting," or "afternoon break." The "start-of-day" feature is special in that it contains only a start-time probability distribution. Similarly, the "end-of-day" feature is special in that it contains only an end-time probability distribution. In one embodiment, each feature model is stored in computer readable memory and contains: (1) an identifier of the name; (2) a start-time probability distribution; (3) an end-time probability distribution; and (4) a duration probability distribution. In one embodiment, the feature is correlated with the day of the week on which it was generated. The above process is repeated for each day of the week and for each location over which the individual collects presence information.

A second embodiment of the present invention is directed to a method and system for using the feature models to predict if an individual (currently inactive) may be within one of the feature models, and if so, the likelihood that the person is so located. This process may be run periodically, or in response to an inquiry from a user wanting to contact the individual at some future time. Namely, if a feature model can be predicted with high confidence, then the person's return time may be accurately predicted.

According to this process, an individual's current inactivity are known based on the presence data being collected in real-time. The start-time (and date) of the inactivity and the duration of the inactivity are given. The process examines the feature models to determine which feature model (of the given day) contains a range in which the given start-time is located. The range is defined, in one embodiment, as the midpoint (or median) of the model's start-time distribution and the midpoint (or median) of the model's end-time distribution. In this fashion, a particular feature model is identified. Once the feature model is identified, the process scans the daily records of the activity database to locate: (1) the number of periods of inactivity that are instances of the feature model and are similar to the start time of the individual's current inactivity period; (2) the number of periods of inactivity that are similar to the start-time and at least as long as the duration of the individual's current inactivity period but are nevertheless not instances of the feature model; and (3) the number of periods of inactivity that are similar to the start-time of the individual's current inactivity but are shorter in duration and are not instances of the feature model. The searches that are performed above use a measure of standard deviations between characteristics (e.g., start-time, end-time, duration) of the periods to determine similarity.

A likelihood that the individual is within the selected feature model is therefore the ratio of the number found in (1) divided by the sum of the numbers found in (1) and (2). The smaller the current period of inactivity, then the larger the number found in (2) which will bring down the ratio. The longer the period of inactivity, then the larger the value of (3), and smaller the value of (2), thereby increasing the ratio. A report can be generated merely indicating the model and the likelihood value. Alternatively, the process may not report any state information unless the likelihood value is above some threshold (e.g., 80 percent). Alternatively, the report may indicate an expected time a person is going to return based on the identified feature model.

More specifically, an embodiment of the present invention is directed to a computer implemented method (and computer system) of creating an activity rhythm model, the method comprising: a) accessing a database of activity data based on presence information of an individual at a location and gathered over time; b) for a selected weekday, computing probabilities over time that the individual is active at the location during the selected weekday; c) based on the probabilities, determining features of inactivity that correspond to the selected weekday; d) searching the database to identify a plurality of feature instances corresponding to a first feature of the features of inactivity; and e) computing probability distributions of characteristics of the plurality of feature instances and storing, in computer memory, the probability distributions along with an identifier of the first feature as a model of the first feature.

Embodiments include the above and wherein the characteristics of the plurality of feature instances comprise a start-time; and end-time; and a duration and wherein further the probability distributions of the model of the first feature comprise: a start-time distribution; an end-time distribution; and a duration distribution.

Further embodiments include a computer implemented method (and computer system) of predicting a state of inactivity, the method comprising: a) based on a current time and a duration of inactivity of an individual at a location, searching a plurality of feature models to determine a particular feature model that coincides with a start-time of the period of inactivity; b) searching a database of activity data to identify a set of periods of inactivity that correspond to the particular feature model; c) searching the database to identify a set of periods of inactivity that are similar to the duration of inactivity but that do not correspond to the particular feature model; and d) computing a likelihood value, based on the b) and c), that the individual is within the particular feature model and reporting an identification of the particular feature model and the likelihood value.

Embodiments include the above and wherein each feature model of the plurality of feature models comprise: a name; a probability distribution of start-times of feature instances of the database; a probability distribution of end-times of the feature instances; and a probability distribution of durations of the feature instances.

BRIEF DESCRIPTION OF THE DRAWINGS

FIG. 1D is a flowchart of the steps in a process for collecting and analyzing data and applying results, according to an embodiment of the present invention.

FIG. 7A is a flowchart of the steps in a process for estimating time of likely return from a period of idleness, according to an embodiment of the present invention.

FIG. 7D is a flowchart of the steps in a process for estimating time of likely end of a period of activity, according to an embodiment of the present invention.

FIG. 20 is a flow chart of the steps in a computer implemented method for detecting the real-time inactivity of an individual and determining the likelihood the person is engaged in an identified significant feature, in accordance with one embodiment of the present invention.

FIG. 21 illustrates the determination of likelihood a person is engaged in a particular activity, according to one embodiment of the present invention.

DETAILED DESCRIPTION OF THE INVENTION

Figure 1A:
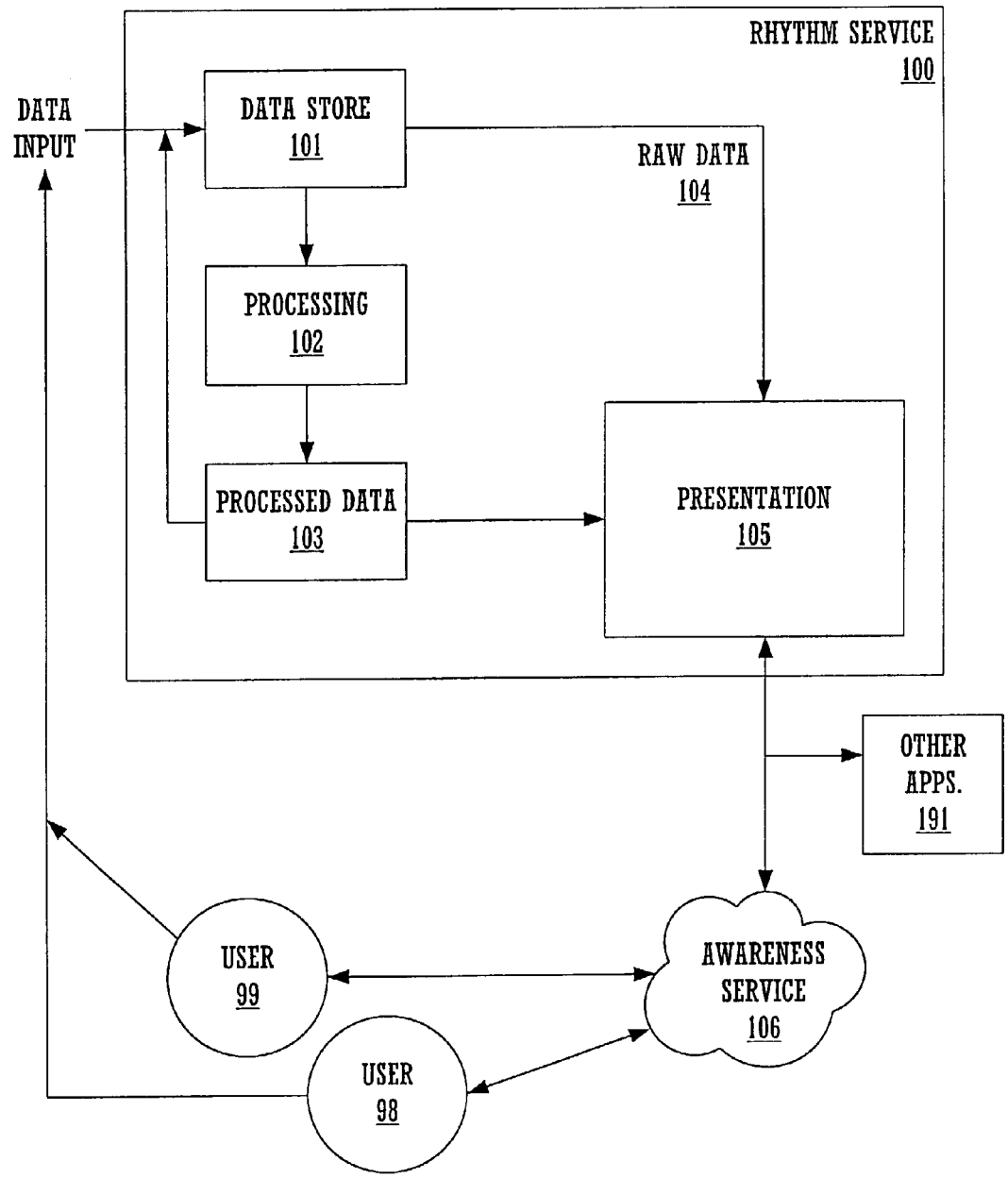
FIG. 1A depicts a rhythm service, according to an embodiment of the present invention.

In the following detailed description of an embodiment of the present invention, a method and system for inferring and applying coordination patterns from individual work and communication activity to facilitate communication between people, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., processes 100D, 700A, 700F, 900, 1100, 1200, 1500, and 1600, and others) are presented in terms of procedures, steps, logic blocks, processing, and other symbolic representations of operations on data bits that can be performed on computer components. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "gathering" or "processing" or "computing" or "forwarding" or "calculating" or "determining" or "formatting" or "displaying" or "receiving" or "generating" or "storing" or "executing" or "collecting" or "promulgating" or "estimating" or "plotting" or "examining" or "predicting" or "estimating" or "comparing" or "analyzing" or "setting" or "notifying" or "accessing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention are described in the context of a networked system of general-purpose computer systems. However, it is to be appreciated that the present invention may be utilized in other types and arrangements of computer systems involved in electronic communication.

A Method and System for Inferring and Applying Coordination Patterns From Individual Work and Communication Activity Exemplary Activity History Server With reference to FIG. 1A, an activity history server, e.g., rhythm service 100 provides information to an awareness service (e.g., a network of awareness servers) such as awareness service 106 that can be useful for inferring and applying coordination patterns from individual work and communication activity. Multiple users 98 and 99 can be served by Awareness service 106. The users 98 and 99 can transmit information and requests to Awareness service 106 and receive information from Awareness service 106. Users 98 and 99 can generate data for input to the rhythm service 100. The data input is received and stored by a data store 101.

Data from data store 101 is processed in a processor 102. Processor 102 renders the data more amenable to subsequent presentation. After processing, the data is held in a processed data repository 103, and can also be re-stored in processed format by data storage 101.

A presentation module 105 receives data from processed data repository 103 and formats the information for an end user, which is an awareness network 106 or another end user. Awareness network 106 can promulgate collegial schedules, rhythms, activities, and idleness. Awareness network 106 can be used to coordinate communications and other applications 191, as described below. Alternatively, presentation module 105 can also support additional applications 191 directly. Certain raw data 104 (e.g., unprocessed by processor 102), such as calendar appointments and similar electronically formatted information, can also be received by presentation module 105 directly from data store 101.

Figure 1B:
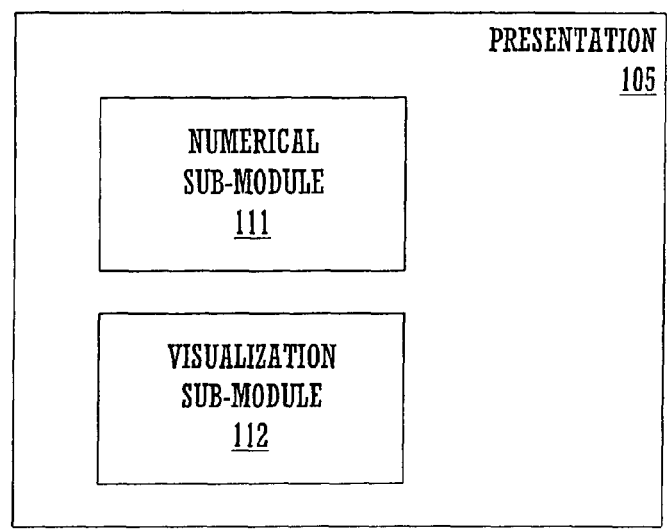
FIG. 1B depicts a presentation module of a rhythm service, according to an embodiment of the present invention.

Referring to FIG. 1B, Presentation module 105, in one embodiment, contains a numerical submodule 111 for formatting numerically rich data and a visualization submodule 112 for formatting graphically rich data.

Data Collection Techniques

Figure 1C:
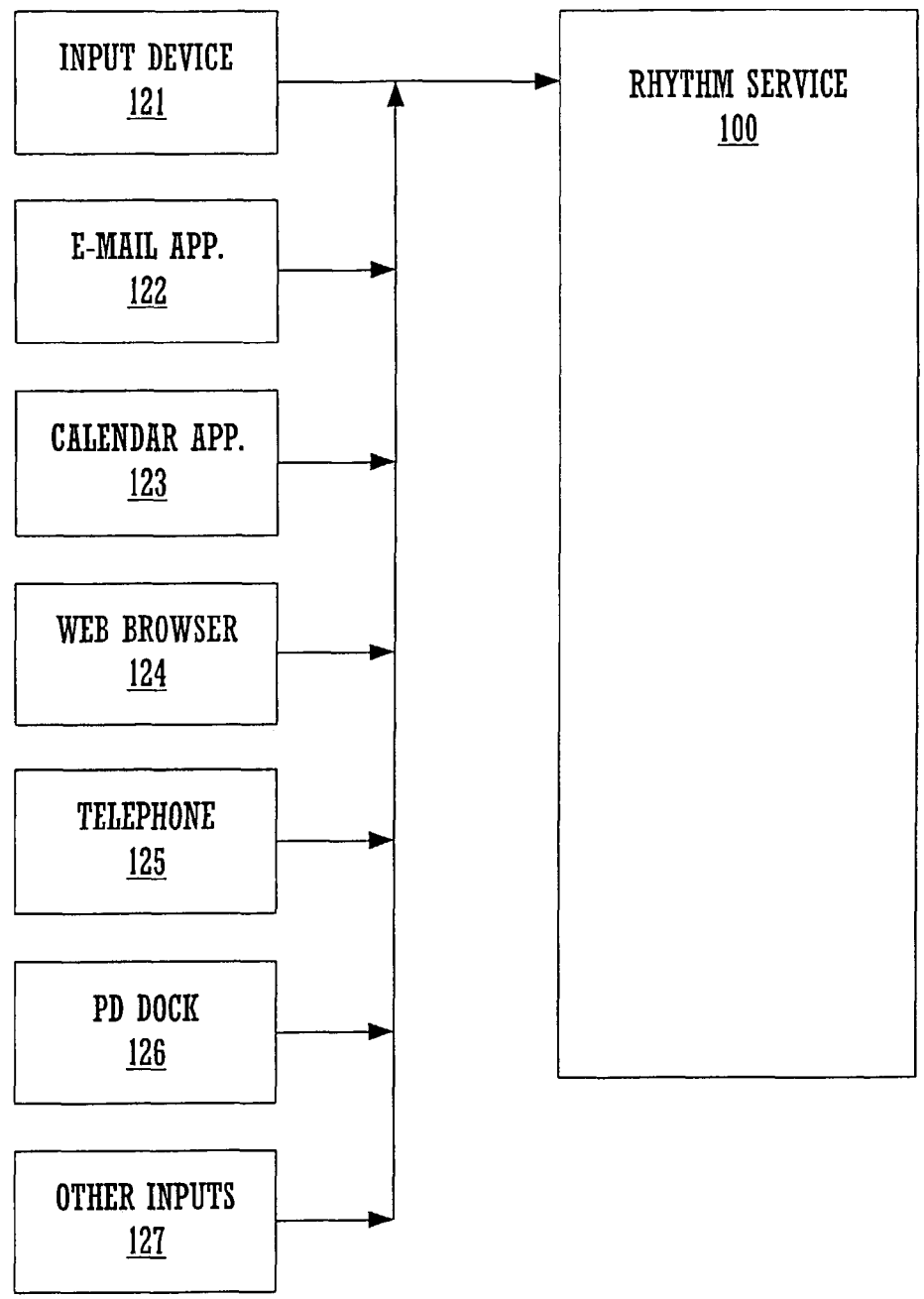
FIG. 1C depicts data sources coupled with a rhythm service, according to an embodiment of the present invention.

Rhythm service 100 can receive information from a more than one source. With reference to FIG. 1C, the data input to rhythm service 100 can be received from a number of applications deployed upon the computer hosting rhythm service 100. Data input to rhythm service 100 may comprise information as simple as that a particular application is currently in use, that a particular piece of hardware is in use, or that a person is driving or picking up an item.

An input device 121 such as a keyboard, mouse, and/or a graphical user interface (GUI) provides an input that informs rhythm service 100. Each stroke on the keyboard, movement of the mouse, and/or click on the mouse or GUI can provide to rhythm service 100 the information that a user of that particular keyboard, mouse, or GUI is present at the computer work station to which the input device is attached. Further, such data informs rhythm service 100 that the user of that particular input device is actually engaged in some activity using the input device. It is appreciated that other input devices, such as trackballs, speech to text and other dictation applications, shorthand applications, scanners, digitizers, and handwriting to text applications can be used as well with an embodiment of the present invention.

If a user operates any input device 121, such as by pressing any key or bar on a keyboard or moving a mouse, that activity is recorded in a log as, for example an activity pulse or another record. Such activity pulses are extracted from the log in multiple continuous blocks of activity by compiling all subsequent minutes in which the user was actively using input device 121 into a single period (e.g., block) of activity. The duration of that block of activity is the number of minutes for which a pulse was recorded. One embodiment of the present invention thus provides a minute by minute granularity but any fine base could be used.

Such information can be filtered or augmented by additional information. For example, when a particular user logs onto a work station computer or network, data received from input device 121 may inform rhythm service 100 that that particular user is present and/or engaged in certain activities associated with the input device 121. Similarly, such information may be provided with data from other applications.

Email application 122 provides information to rhythm service 100 such as that a user has accessed and activated the application, such as for downloading and/or writing email. Email activity can be collected at a number of points. Points at which email activity data can be gathered include an email server, the user's email client, or a server proxy intermediating between the email server and client. Instant Messaging (IM) and Short Messaging Service (SMS) can similarly provide input, in some embodiments.

In the proxy embodiment, an inference is made as a user retrieves the body of an email message that the user is reading the email. This 'reading' activity is recorded in the user's activity log, in a manner similar to how activity data regarding use of input device 121 is recorded. Upon sending an email, that activity is detected and logged as well by the proxy in that user's activity log. Instant messaging activity can be gathered via a proxy or other mechanism in a similar manner as email.

Calendar application 123 electronically schedules appointments. Information from calendar application 123 may prove especially useful to rhythm service 100. For example, data a user enters into his/her calendar application, such as updating, modifying, and/or correcting a list of appointments and/or scheduled activities can be valuable to planning when, where, and how to contact that user. Information from calendar application 123 is retrievable via command line interfaces, GUIs, web queries, and a variety of other mechanisms.

When a user activates the web browser 124 associated with the computer work station to which they are assigned, web browser 124 informs rhythm service 100 that the user of that web station is present and engaged at his work station. Similarly, a telephone 125 in the office in which a user is stationed informs rhythm service 100 when the user is using the telephone 125.

The information provided by web browser 124 and telephone 125 can include rich data about the activities being performed thereon. For example, data such as web browsing, file transfers, web-based intercommunications and the like can be provided by web browser 124. Similarly, telephone numbers and caller identity information about calls received and/or initiated can be provided by telephone 125.

The information provided to rhythm service 100 by web browser 124 and/or telephone 125 can also be simpler. For example, it may suffice in a particular network operation for telephone 125 to simply inform rhythm service 100 that the telephone is in use. In this example, web browser 124 may simply inform rhythm service 100 that the application has been activated. Rhythm service 100 can be informed whenever the hook switch or another sensor of telephone 125 is activated, indicating that the handset of telephone 125 has been lifted and thus, that telephone 125 is in use. Telephone activity can be detected at the telephone switch to which the user's telephone is connected. In fact, such telephone activity is regularly collected for billing and other purposes.

A dock 126 for a personal data processing device (PD), such as a hand held computer, personal information manager, cellular telephone, laptop computer, or the like, can also provide information to rhythm service 100. Dock 126 can inform rhythm service 100 whenever its associated personal device is docked with it and/or removed from docking. More complete information may further be provided, such as that the personal device has been synchronized with the computer work station, or that certain activities such as file transfers are in progress.

Other inputs 127 can derive from a variety of other services and devices, such as instant messaging (IM), short messaging service (SMS), cellular telephones, etc. It is appreciated that the applications listed herein are exemplary, and that a host of other applications are amenable to integration with rhythm service 100 in a similar manner and for similar purposes.

With reference to FIG. 1D, a process 100D is described. Process 100D is a general overview of a method by which a system for inferring and applying coordination patterns from individual and communication activity operates, according to one embodiment of the present invention. Process 100D begins with step 110D, wherein data is collected on computer and other activity, communications activity, and the like.

Data collection, to accomplish step 110D, in one embodiment is effectuated by gathering from a number of sources inputs that relate information to an information gathering and processing entity regarding the activities of a person whose activities are to be monitored. In one embodiment, these data collection sources can be input device 121, email application 122, calendar application 123, web browser 124, telephone 125, PD dock 126, etc., and the entity gathering these inputs and processing the information therein can be rhythm service 100 (FIG. 1C). In one embodiment, rhythm service stores the data for subsequent processing.

In step 120D, the activity reported by the data collected is analyzed. The collected data is retrieved from storage to undergo the analysis, which can be performed as a function of processing the data. Processed data can be deposited in a repository of processed data for subsequent further analysis and/or formatting for presentation.

Figure 2A:
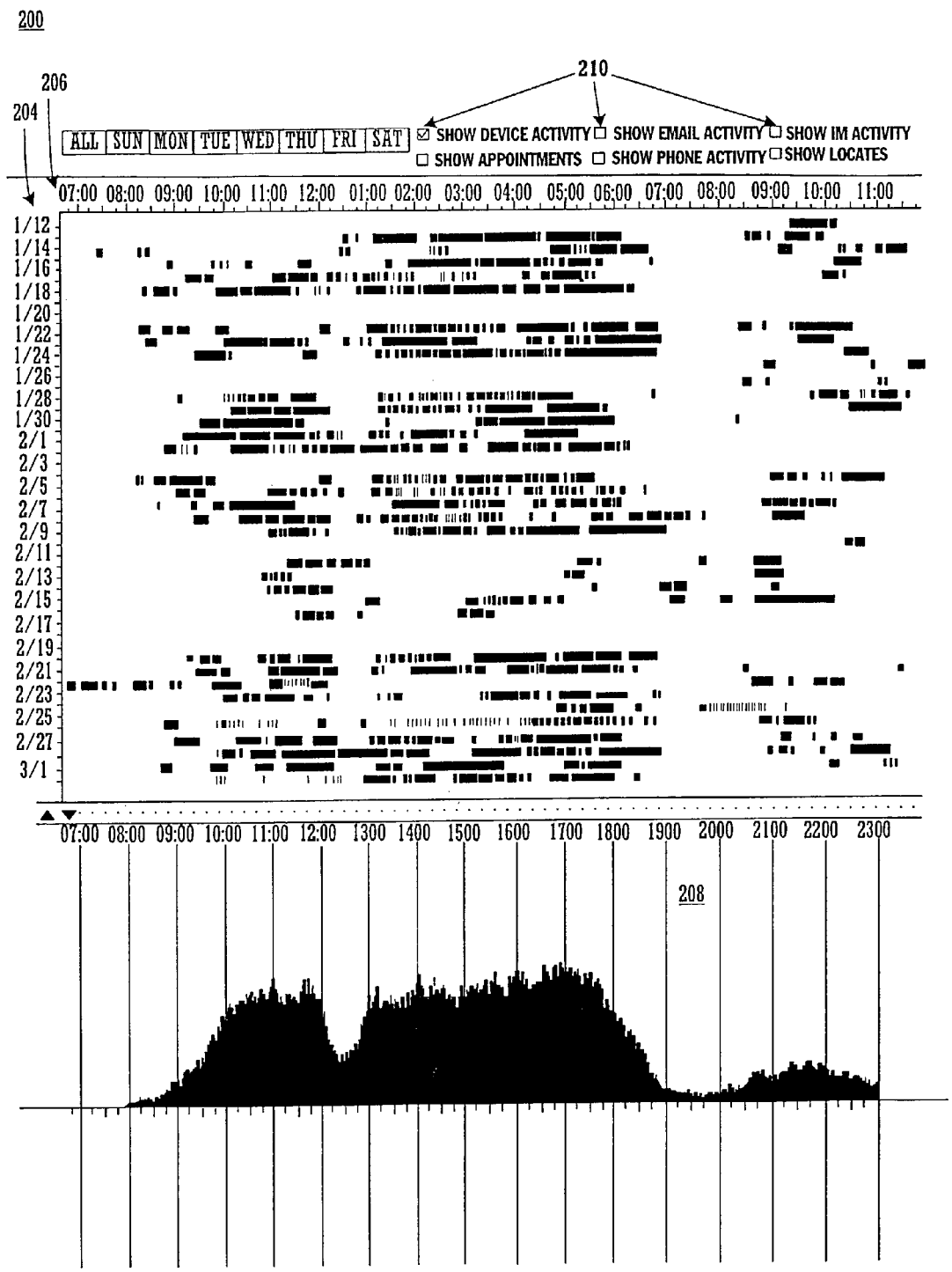
FIG. 2A illustrates an exemplary "actogram" and histogram of aggregated activity, according to an embodiment of the present invention.

In one embodiment, analysis of these activities takes place on a number of levels. On the first level, periods of activity are plotted for each day (e.g., actogram 200A; FIG. 2A). The analysis continues with accumulating activity periods for a number of days. The daily rhythms can be plotted histogramically (e.g., level of aggregate activity 208; FIG. 2A) to discern typical daily rhythms. These rhythms can be analyzed for day-to-day variation (e.g., FIG. 3). They can be analyzed for correspondence to scheduled appointments (e.g., FIG. 2B) and other activities.

In step 130D, periods of idleness and periods of activity are then analyzed. In one embodiment, this level of analysis effectuates estimating when a person whose activity is under analysis is likely to return from an appointment or other absence, and/or to estimate how long a person is likely to remain active (e.g., FIGS. 7A-7D). The estimations effectuated herein render the present embodiment predictive.

In one embodiment, processed data (as well as some raw data, such as from calendar inputs), are formatted for presentation. This formatting is performed on processed data (including numerically and/or graphically rich data) for promulgation to a user such as an awareness service. Promulgation can include displaying the processed information on a monitor, printing a hard copy incorporating the processed information, transmitting the processed information to a specific user, and making the processed information available on a network, among others. Where the information is transmitted or made available on a network, promulgation can selectively be subject to a security regime to safeguard the privacy of the person whose activities are being analyzed.

In step 140D, the results of the analyses conducted under the preceding steps are used to effectuate a number of applications, completing process 100D. In one embodiment, the analytical results are applied to coordinate communications. For instance, the results can determine when the best time is to reach a person whose activities are under analysis by telephone, how receptive that person is to telephonic communications while engaged in certain activities, and/or if a person can be reached by telephone at a particular time on a certain day of the week.

In one embodiment, the receptivity of a person whose activities are under analysis to email can be determined (e.g., FIGS. 8-15). In one embodiment, people can use the results of analysis of their own activities to help them in their own efforts at time management. This information can also have supervisory practicality for managers of people whose activities are so analyzed.

In one embodiment, people can use the results of analysis of their own activities to help them in their own efforts at coping with stress and with scheduling breaks and alternative physical activities important for them to prevent stress and certain repetitive motion injuries. This information can also have practicality for medical and other therapists treating people whose activities are so analyzed. In one embodiment, alarms and/or notices of upcoming appointments and other events requiring the attention of a person whose activities are under analysis can be scheduled to be promulgated to the person and his co-workers and managers as necessary, each at the most convenient time and in a format to which they are each the most receptive.

In one embodiment, the results of analysis can be used to schedule certain maintenance activities. For instance, analysis of a person's computer activities can help an information technologist schedule the best or most convenient and least intrusive time for backup, maintenance, and/or programming and/or upgrading software on the work station computer of a person whose activities are under analysis. Similarly, a network or communications technologist can schedule maintenance, switching, and re-routing of network and telecommunications equipment used by the person whose activities are under analysis. The analyses described above, as well as some of these applications will be discussed further below.

Exemplary Activity Analysis

Once information has been gathered and provided to rhythm service 100, the information is analyzed by processing and presented. With reference to FIG. 2A, a screen shot of a GUI 200 is depicted. GUI 200 includes an actogram 202. Analysis of activity history begins by plotting periods for each day in an activity graph, e.g. actogram 202. Actogram 202 plots level of activity as an aggregate of individual activity pulses gleaned by information gathering media (e.g., input device 121, email application 122, telephone 125, etc.; FIG. 1C). Actogram 202 displays activity periods for an exemplary user as bands of black or dark bars 202 for a number of days, shown as dates on date bar 204. The activity periods correspond to clock time for a selected time zone, shown on time bar 206.

Actogram 202 shows that the exemplary user whose activity is plotted therein generally has less interrupted blocks of activity at the start and end of her day. The intervening blocks of activity during the day are shorter and more interrupted. Thus, a caller is generally more likely to catch the exemplary user at her desk or other workstation just after her arrival there and just before departure.

Actogram 202 can be promulgated by an activity server, such as rhythm service 100 (FIG. 1A). Actogram 202 can display a variety of information, as presented by the activity server's presentation module, such as presentation module 105 (FIG. 1A). The formats of actogram 202 may include data about device activity, email activity, telephone activity, appointments scheduled, instant messaging activity, and expected and/or active work locales. These formats can be selectable via GUI 200, such as by checking activity data selection radio buttons 210. Radio buttons 210 allow a user to select processed or raw data from various sources (e.g., input device 121, email application 122, calendar 123, etc.; FIG. 1C) for actogram 202 to display.

Continuing the analysis, activity periods can be accumulated for a number of days. In this manner, typical daily rhythms can be discerned for a particular person whose activities are under analysis. Such typical daily rhythms include arrival, departure, and lunch periods, for example. Actogram 200 displays such information as a level of aggregate activity 208 plotted as a function of time.

By referring to level of aggregate activity data 208, it can be discerned that the person whose activities are under analysis typically begins between 9:00 a.m. and 10:00 a.m.; her aggregate activity level 208 is seen to rise significantly at that time. She takes lunch between 12:00 noon and 1:00 p.m.; her aggregate activity level 208 is seen to fall off significantly at around noon and rise significantly again upon return. Generally, she leaves work about 6:15 p.m., and is definitely gone by 7:00 p.m.; her aggregate activity level 208 is seen to fall off significantly at that time of day. It can further be discerned that she is sometimes active in the evenings, between 8 p.m. and 11:00 p.m.; her aggregate activity level 208 is seen to rise slightly between those times.

A person's activity patterns are also dependent on the appointments scheduled in their calendar. Periods of apparent non-activity during the work day are often explained by appointments at a locale apart from their normal work station, computer, telephone, etc. Thus, analysis of the exemplary person's activity can progress by including calendar schedule with activity data.

Figure 2B:
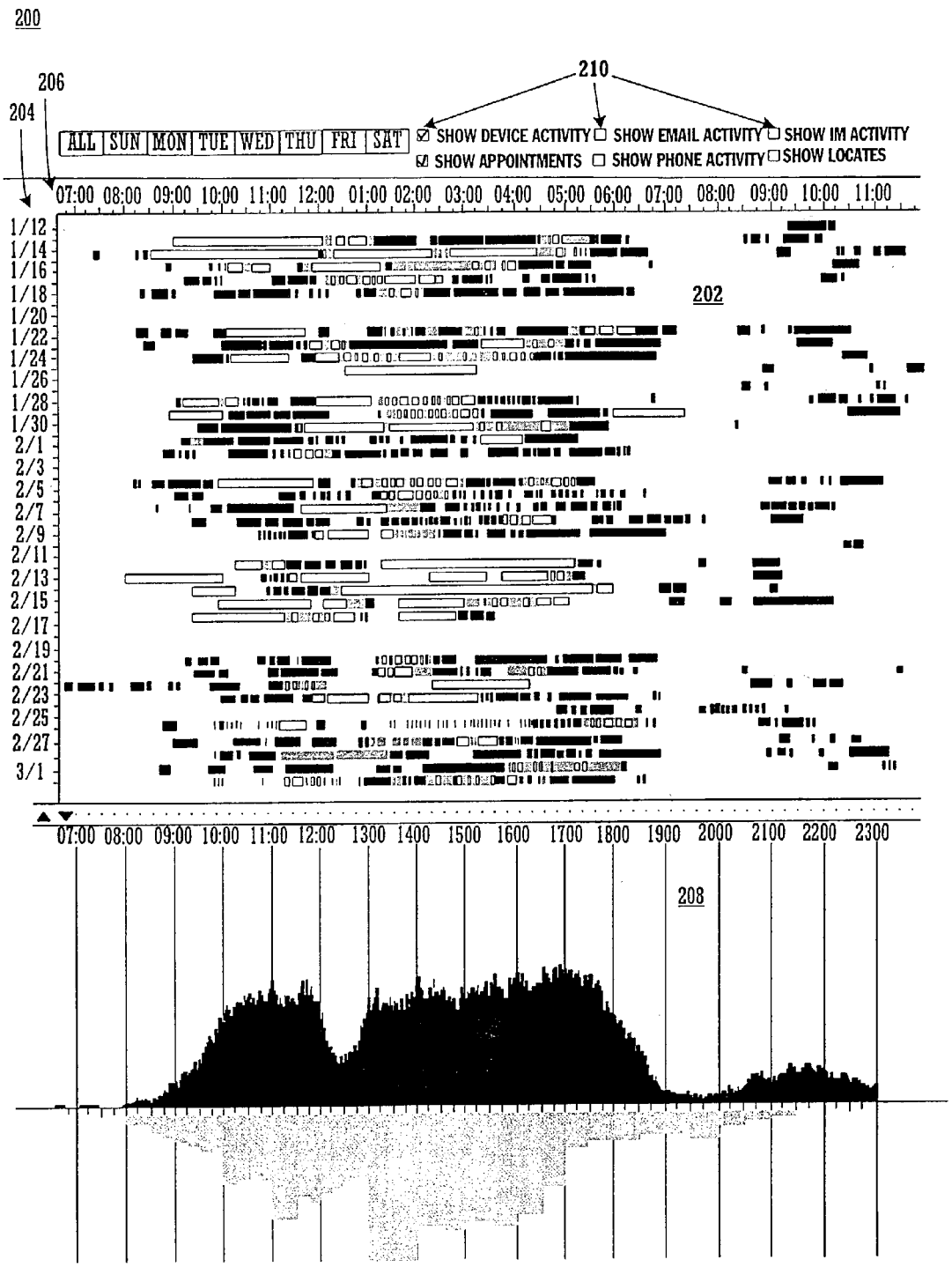
FIG. 2B illustrates an exemplary "actogram" and histogram of aggregated activity with appointment information added, according to an embodiment of the present invention.

With reference to FIG. 2B, GUI radio buttons 210 show that, in addition to device activity, calendar appointments are selected for display by actogram 200B. These calendar appointments are displayed as translucent white bands 212 interspersed amongst activity periods for the exemplary user as bands of black or dark bars 202. In this fashion, where activity does occur during times of scheduled appointments, that activity is displayed as dark gray. Such activity during scheduled appointments can indicate a missed appointment, a cancelled appointment the cancellation of which not calendared, an appointment held at the locale of the person's work station (e.g., a teleconference call or a one-on-one meeting, etc.), or that the person whose activity is under analysis has taken their computer to the meeting for use therein, etc.

Appointments aggregates 219 are shown on level of aggregate activity 208 in white, also. It is appreciated that for display of this and other information, actograms such as actogram 200B of the present embodiment can use shading, translucence, coloring, etc., in fact any other visual and/or graphical technique available.

In one embodiment, a system can compare two or more peoples' rhythms and their schedules for a specific day. This system can suggest overlapping times when both are likely to be available for mutual contact. Similarly, comparing the rhythms and schedules of a group of people can help determine an available meeting time for the entire group. The meeting time suggested can be an optimal time for the group as a whole.

Data collected and displayed by one embodiment exhibit a range of different kinds of useful patterns. Global patterns apply to almost all users across all days. For example, such data show whether each person had well-defined patterns for starting and ending their workdays and taking lunch. These data also show when these events occur.

Role patterns indicate certain patterns unique to particular work roles. For instance, the patterns generated by software developers can be expected to show long stretches of uninterrupted computer activity. Managers on the other hand, can be expected to show more scheduled appointments and more interrupted patterns of computer activity. Group patterns reveal shared patterns among people who share in recurring activities, examples of which include group lunch and staff meetings.

Day of week patterns differ from global patterns. These are patterns unique to a particular day of the week. Day of week patterns are affected, for example, by recurring meetings and/or other weekly events that occur on a given day of the week. Personal patterns define the large extent to which a person's activity history is unique. Such patterns are specific to a particular day of the week, and can reveal the affects of, for instance, alternative work schedules.

Figure 3:
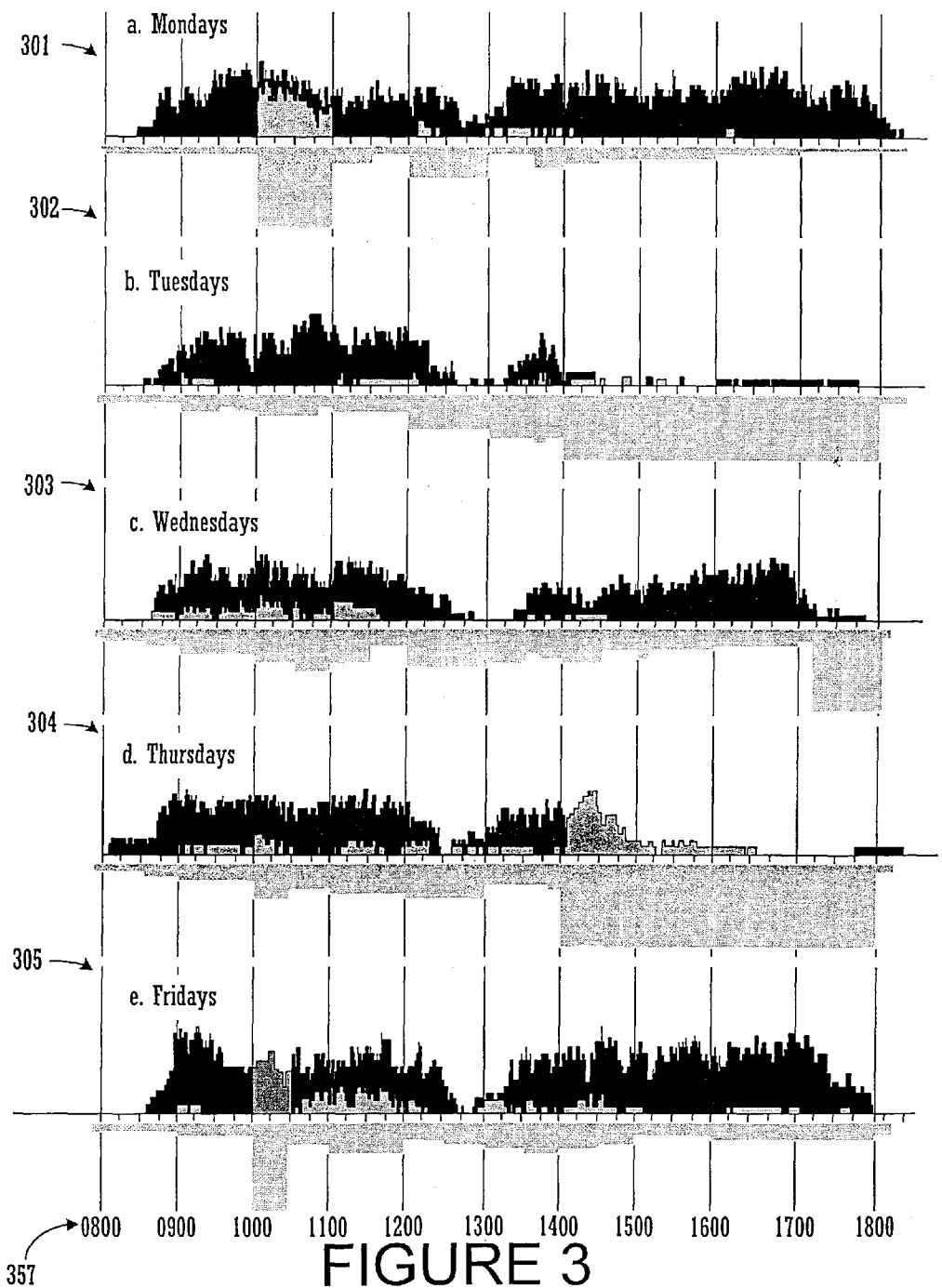
FIG. 3 is a series of histograms of aggregated activity for each day of a work week, according to an embodiment of the present invention.

People's work rhythms can vary on different days of the week. The start and end of the work day, lunch periods, and regular breaks may differ from day to day. Regular weekly appointments and tasking can influence the pattern for a given day of the week. Analysis in accordance with an embodiment of the present invention effectuates separation of a person's activity periods according to one or more days of the week. With reference to FIG. 3, a computer generated actogram array 300 displays the levels of aggregate activity for each day of the week.

It is ascertainable by inspection of Tuesday level of aggregate activity 302 that the exemplary person whose activity is under analysis is not active at their computer after 1:45 p.m. (1345 by 24 hour time bar 357) on Tuesdays. It is further ascertainable by inspection of Thursday level of aggregate activity 304 that this person is also not active at their computer after 2:15 p.m. (1415 by 24 hour time bar 357) on Thursdays. This information is valuable for helping to determine the most appropriate time to reach a person.

Appointments can also be compared to the levels of aggregate activity in actogram array 300 to help determine patterns of absence and presence that are not scheduled in a person's calendar. By inspection of Tuesday level of aggregate activity 302 and of Thursday level of aggregate activity 304, it is noticed that the exemplary person has a recurring appointment scheduled to begin at 2 p.m. (1400 by time bar 357) on both days. Tuesday level of aggregate activity 302 shows that the person actually ceases activity 15 minutes prior to the Tuesday 2 p.m. appointment. However, Thursday level of aggregate activity 304 shows that the person is routinely active as much as 45 minutes past the start of the appointment.

These levels of aggregate activity display examples of absence and presence not explainable by reference to the user's calendar. Another example is seen by inspection of Wednesday level of aggregate activity 303. Wednesday level of aggregate activity 303 shows that the person has a recurring meeting at 5:15 p.m. (1715 by time bar 357). However, the person's activity stops at approximately 4:50 p.m. (1650 on time bar 357) on Wednesdays. This 25 minute disconnect between activity and the scheduled appointment may be understandable as preparation and travel time required for that particular appointment, or by another explanation.

Careful inspection of the levels of aggregate activity comprising actogram array 300 reveals that not all appointments have such buffers. For example, Monday level of aggregate activity 301 shows that activity does not stop before the recurring appointment on Mondays between 10:00 a.m. and 11 a.m. (1000-1100 on time bar 357). In fact, careful inspection reveals that this person is generally active during this appointment.

This apparent dichotomy between a scheduled appointment and the continuing activity during that time period may be understandable by the nature of that particular recurring appointment. For example, this particular appointment may be a conference call during which the person is present and active at their computer. In this case, this information can reveal that, although the person is using their telephone at that time to participate in the conference call, they are still active at their computer, and thus possibly amenable to contact via email, instant messaging, etc.

Figure 4:
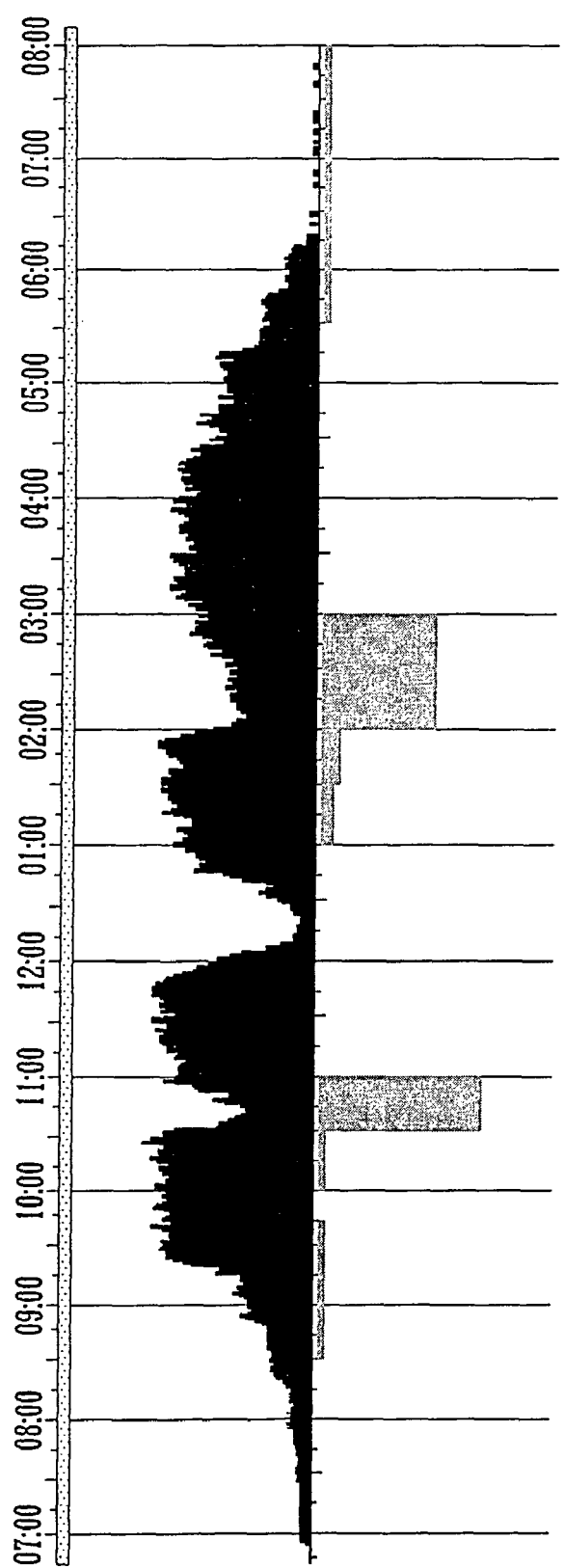
FIG. 4 depicts a histogram of aggregated activity, including appointment data from which lessened availability can be inferred, according to an embodiment of the present invention.

The aggregation of appointments allows a rhythm service such as system 100 (FIG. 1A) to detect periods in which a person is less available than at other times. With reference to FIG. 4, another level of aggregate activity 400 for a Wednesday reveals a bulge in appointments 404 between 8:30 a.m. to 10:30 a.m. and another bulge in appointments 406 between 12:00 to 1:30 p.m. (1330 on 24 hour time bar 457). The appointments are plotted in white trace 402 below activity plot 402.

The earlier bulge, from 8:30 a.m. to 10:30 a.m. may comprise, for example, largely one-time only appointments. In this case, it may not be apparent from browsing their calendar that this is generally a bad time to reach the exemplary person whose activities are under analysis. In contrast, the later bulge from 12:00 noon to 1:30 p.m. (1330 on time bar 457) may largely comprise recurring appointments that might be apparent by browsing the exemplary person's on-line calendar. Thus, it is appreciated that the aggregation of appointments over time provides another bit of information about the exemplary person's work rhythms that cannot easily be determined by simply browsing the person's online calendar, and of which the person her/himself may not be aware.

Figure 5:
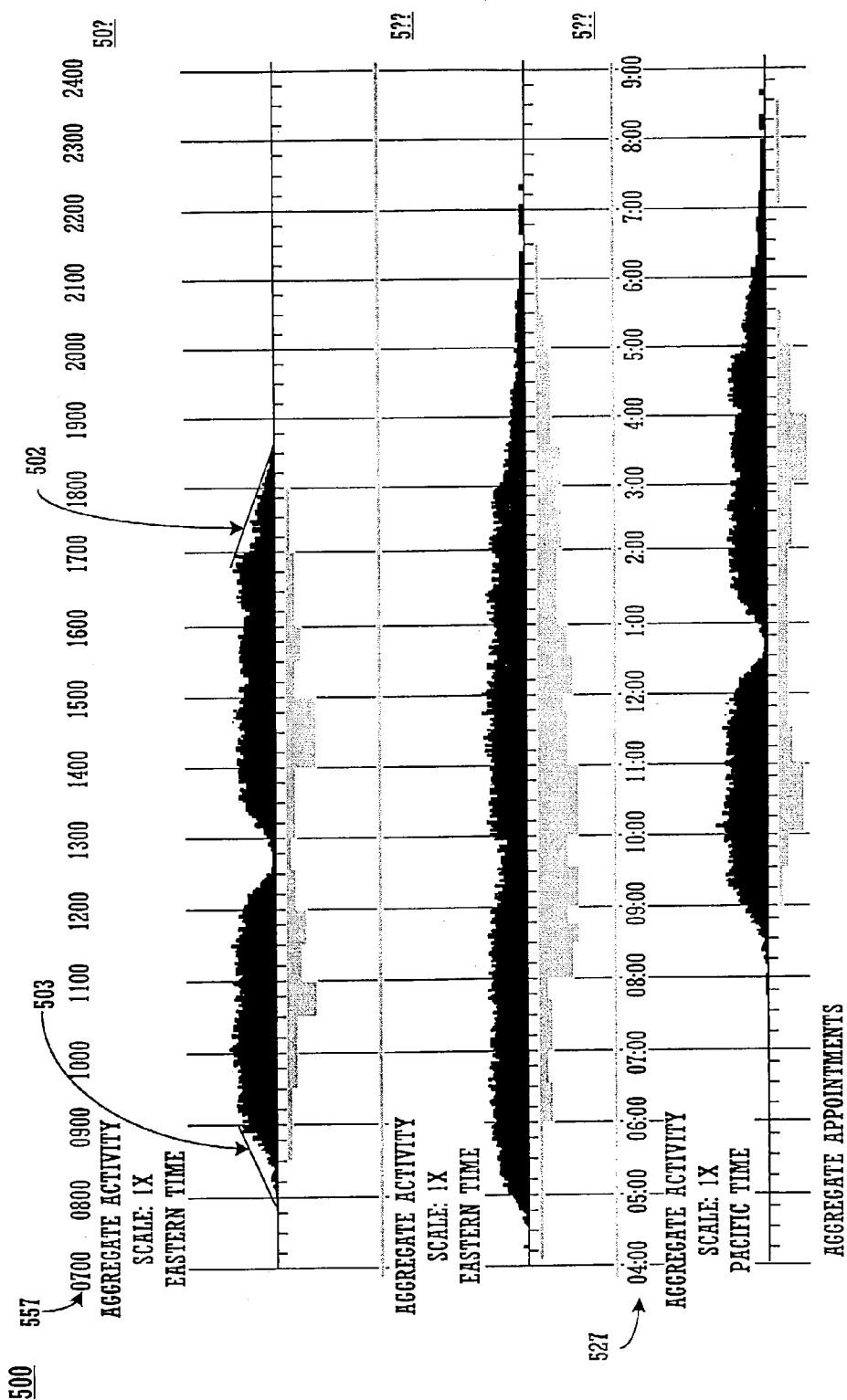
FIG. 5 depicts a series of histograms of aggregated activity with time shifting of one work group member separated geographically by several time zones, according to an embodiment of the present invention.

Some individual patterns have significant predictive power. With reference to FIG. 5A, a plot 500 compares levels of aggregate activity for three different exemplary people whose activities are under analysis. Inspection of the first person's level of aggregate activity 501 displays a stair-shaped pattern 502 at the end of the day. It is observed that there is a large drop in activity at 5:15 p.m., another at 5:45 p.m., and a final cessation at 6:15 p.m. (1715, 1745, and 1815, respectively by 24 hour time bar 557). For this first exemplary person, this end of day pattern is regulated by their use of public transportation with fixed departure times requiring the person to be at a designated pickup point at a designated time.

Whatever the cause, however, the predictive power of this pattern is significant. The pattern can be applied predictively, for example to coordinate communication with the person. For instance, a user of this person's level of aggregate activity 501 can assume that if this person is present past 5:15 p.m., the person is likely to be available until approximately 5:45 p.m. (1715, 1745, respectively by time bar 557).

Inspection of this person's level of aggregate activity 501 also reveals that the beginning of the day displays a similar, though less pronounced pattern 503. Pattern 503 can help a user of this person's level of aggregate activity 501 that, if this person is not in (e.g., active) at 8:15 a.m., then this person is not likely to arrive until 8:45 a.m., at the earliest.

The second exemplary person's level of aggregate activity 510 displays a much wider variance of starting and stopping work. This person also displays a wider variance of lunch-taking patterns, if lunch is taken by this person at all.

The third exemplary person's level of aggregate activity 520 shows a time shift of three hours. Referring to their time bar 527, it is seen that this person's level of aggregate activity 520 is displayed in Pacific Time, whereas the levels of aggregate activity 501 and 510, respectively for the first and second exemplary persons, is in Eastern time, as shown by time bar 557. This particular person also shows fairly regular patterns for starting work and taking lunch. However, this person shows a fairly wide variability in ending work.

The probability that a person will be active at a given time can be determined from calculating that person's mean activity rate during that time.

Figure 6:
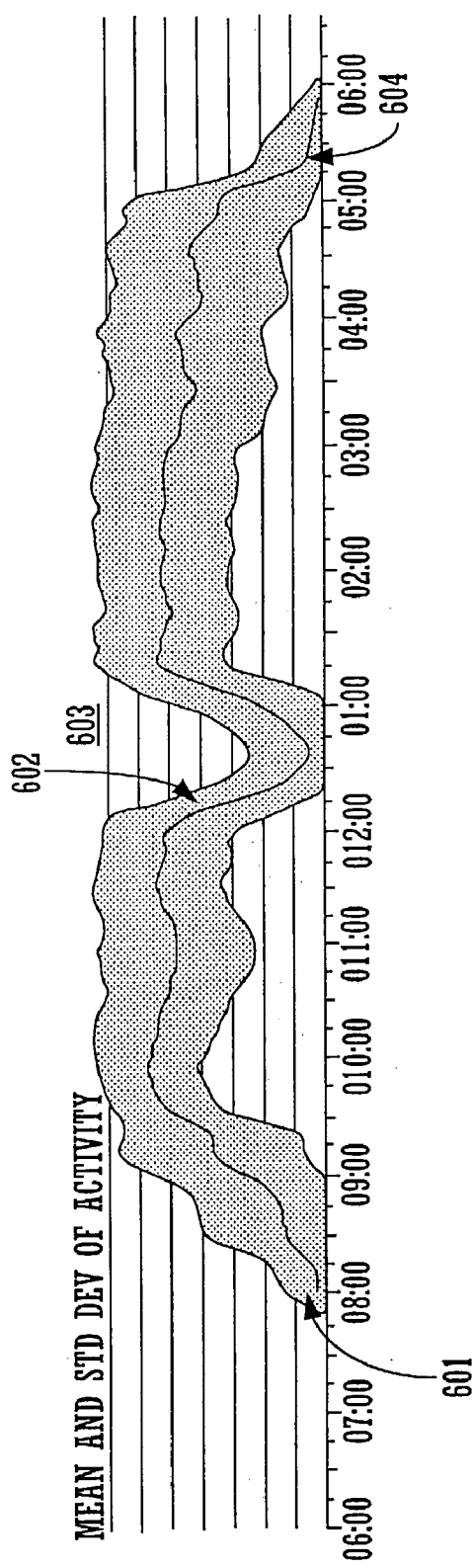
FIG. 6 depicts a graph of aggregated activity with mean activity and standard deviation plotted, according to an embodiment of the present invention.

FIG. 6 shows a plot 600 of the mean activity rate and standard deviation thereof over all Tuesdays for an exemplary person. The periods where the standard deviation narrows have predictive power. For example, such periods of standard deviation narrowing include the start of the day 601, the end of the day 604, lunch 603, and late morning 602.

Analysis of activity at specific tasks, such as email and devices other than the computer can also be useful in one embodiment. Devices other than the computer can include applications such as the telephone and personal devices, such as hand-held computers, cellular telephones, and the like (e.g., telephone 125, PD Dock 126; FIG. 1C). In one embodiment, the times that a person is reading email are detected over an Internet Message Access Protocol (IMAP) connection by watching the protocol messages between the user's email reader software and the IMAP server.

Whenever the client fetches the body of an email message, a rhythm service (e.g., rhythm service 100; FIG. 1C) can infer that the user has taken a deliberate action to retrieve and read that email. This record can be stored and used to determine how often this person reads their email.

Additionally, when the user sends an email, it goes through an email service, such as Simple Mail Transfer Protocol (STMP). This activity can also be detected and recorded. In one embodiment, the records of reading and sending email are combined to construct a model of this person's email activity throughout a workday. Email activity can also be selected for display by a GUI or other means and displayed on a level of aggregate activity (e.g., GUI radio buttons 210 and level of aggregate activity 208; FIG. 2A).

Further, by examining exactly what messages were retrieved and responded to, one embodiment models this person's responsiveness to email in general, perhaps depending on variables such as time of day, person's telephone activity at the time the email was received, and occurrence of appointments away from or in the person's office.

Similar modeling of other activities is effectuated in one embodiment by detection of the other activities, such as by input of applications associated therewith to a rhythm service (e.g., web browser 124, telephone 125, PD dock 126, rhythm service 100; FIG. 1C), collection and processing of corresponding data, selection for display by a GUI or other means (e.g., GUI radio buttons 210 and level of aggregate activity 208; FIG. 2A). In as much as modeling of these various activities is effectuated in several embodiments by similar processes, modeling will be illustrated herein by reference to email receptiveness modeling below (e.g., Exemplary Modeling of Email Receptiveness), for brevity and clarity. It is appreciated however that, although the data collection means vary (e.g., applications 121-126; FIG. 1C), the data is processed and displayed by similar means for each activity, email, telephone, devices, IM, and the like.

Exemplary Analysis of Idle and Active Periods

In one embodiment, analyzing the periods of non-activity provides useful information to help predict when a person is likely to return from an appointment. This information can be used to coordinate communications, such as determining a good time to reach that person. Analysis of idle periods proceeds by a process 700A, described with reference to FIG. 7A. In one embodiment, process 700A is an automated process performed by a computer implemented system such as rhythm service 100 (FIG. 1A, 1C). Process 700A begins with step 701, wherein idle periods between the first and last active periods of a day are examined.

Figure 7B:
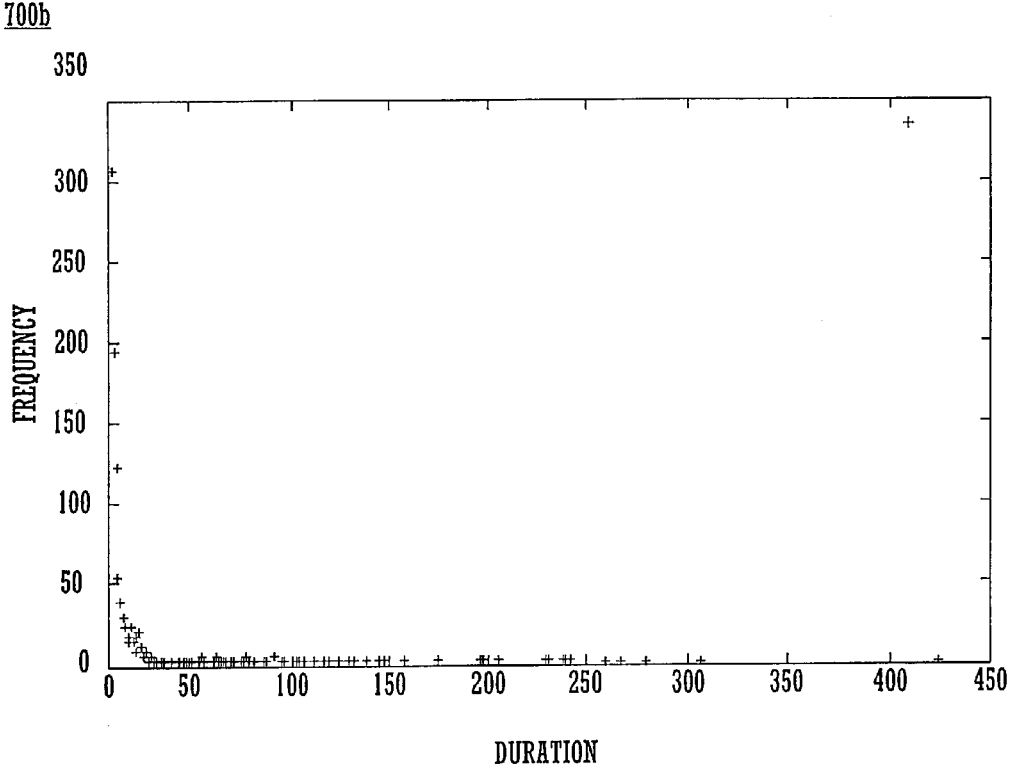
FIG. 7B is a plot of frequency of periods of idleness plotted as a function of duration of idleness, according to an embodiment of the present invention.
Figure 7C:
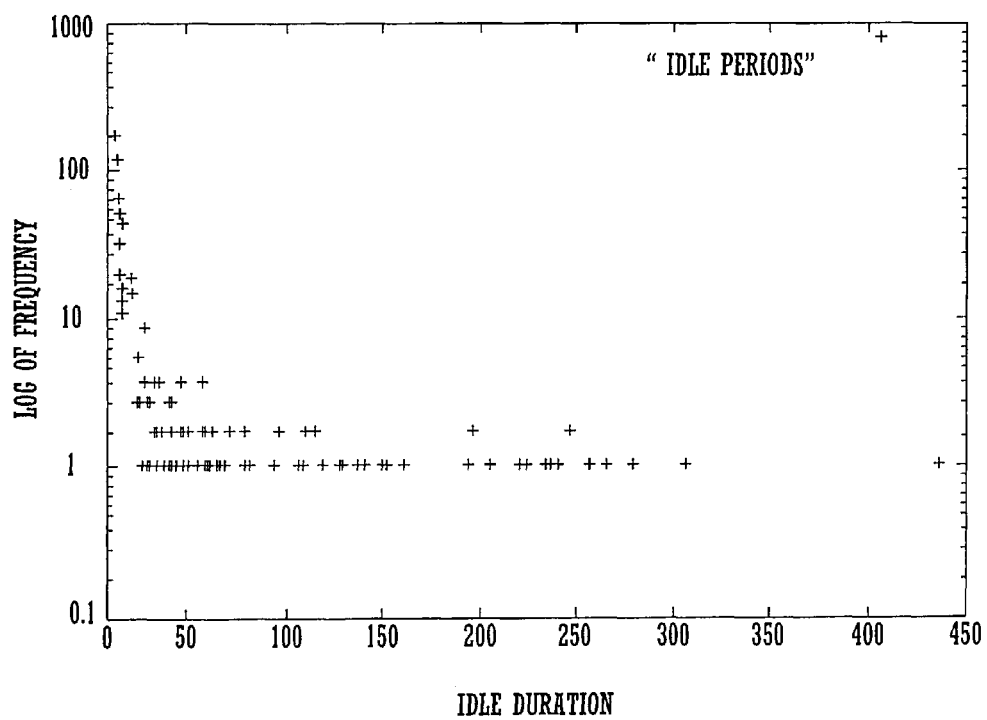
FIG. 7C is a log plot of the frequency of periods of idleness plotted as a function of duration of idleness, according to an embodiment of the present invention.

In step 702, the frequency of idle periods of each duration is calculated. In step 703, a distribution of frequencies of idleness is plotted. With reference to FIG. 7B, the frequencies of idleness are plotted directly as a linear function of the duration of idleness on a distribution 700B. In one embodiment, the logarithm of frequency of idleness is plotted as a logarithmic function of duration of idleness on a distribution 700C, depicted in FIG. 7C.

In step 704, the distribution of frequencies of idleness plotted is automatically examined and compared with real time information. Such real time information is gathered in one embodiment from sources such as input device 121, email application 122, web browser 124, telephone 125, PD dock 126, etc. (FIG. 1C). In the present example, plots 700B and 700C (FIG. 7B, 7C, respectively) plot data gathered from computer input device 121 to plot periods of idleness from a computer at a particular workstation to which an exemplary person whose activities are under analysis is assigned.

In step 705, the results of this comparison are used to estimate a time of likely return from the present period of idleness, completing process 700A. In one embodiment, the time of likely return is estimated automatically, such as by a computer implemented calculation of the closeness of the present period of idleness to the distribution of frequencies.

An embodiment of the present invention effectuates useful observations about periods of idleness. For instance, with reference to FIG. 7C, it is observed that, for the exemplary person whose activities are under analysis, periods of idleness having short duration (e.g., less than ten minutes) have relatively high frequencies (greater than ten and into the hundreds) for a 6-month data set. It is also observed therein that longer duration periods of idleness have relatively low frequencies (e.g., not more than ten, and generally two or less). Distributions of idleness such as distributions 700B and 700C combine the affects of whatever processes are driving the work rhythm of the particular person whose activities are under analysis. Thus, the overall shape of these distributions reflect the underlying contributory processes driving them.

Coupling real-time data from a source such as input device 121 (FIG. 1C), the idle period frequency plotted is used in one embodiment to predict (e.g., estimate), as in step 705 of process 700 when the person whose activities are under analysis will return from a period of idleness.

Activity periods are analyzed in one embodiment in a manner similar to that by which periods of idleness are analyzed. The present embodiment includes the analysis of the frequency of activity period durations, similar to the idle period analyses described above. From this, the system (e.g., rhythm service 100; FIG. 1A) determines the typical duration of an interval in which the exemplary person is active. Like idle period analysis, this information can be combined with real-time activity information to predict (e.g., estimate) how long the exemplary person is likely to remain active.

Thus, with reference to FIG. 7D, a process 700D estimates how long an exemplary active person will remain active. In one embodiment, process 700D is an automated process performed by a computer implemented system such as rhythm service 100 (FIG. 1A, 1C). For brevity and clarity, distributions will not be discussed herein as they were for process 700A; the processes are similar and the distributions can be interpreted similarly. Process 700D begins with step 761, wherein active periods between the first and last idle periods of a day are examined.

In step 762, the frequency of active periods of each duration is calculated. In step 763, a distribution of frequencies of activity are plotted. In step 764, the distribution of frequencies of activity plotted is examined and compared with real time information. Such real time information is gathered in one embodiment from sources such as input device 121, email application 122, web browser 124, telephone 125, PD dock 126, etc. (FIG. 1C).

In step 765, the results of this comparison are used to estimate a time of likely end of the present period of activity, completing process 700D. In one embodiment, the time of likely end of present activity is estimated automatically, such as by a computer implemented calculation of the closeness of the present period of activity to the distribution of frequencies.

Exemplary Modeling of Email Receptiveness

One embodiment models a person's responsiveness to email by looking at what messages were retrieved and responded to, depending on variables such as time of day, person's telephone activity at the time the email was received, and occurrence of appointments away from or in the person's office. Similar modeling of other activities is effectuated in one embodiment by detection of the other activities, such as by input of applications associated therewith to a rhythm service (e.g., web browser 124, telephone 125, PD dock 126, rhythm service 100; FIG. 1C), collection and processing of corresponding data, selection for display by a GUI or other means (e.g., GUI radio buttons 210 and level of aggregate activity 208; FIG. 2A).

In as much as modeling of these various activities is effectuated in several embodiments by similar processes, modeling will be illustrated herein by reference to email receptiveness modeling alone, for brevity and clarity. It is appreciated however that, although the data collection means vary (e.g., applications 121-126; FIG. 1C), the data is processed and displayed by similar means for each activity, email, telephone, devices, IM, and the like. Thus, receptivity to contact by telephone, IM, etc., is modeled in a similar manner by another embodiment.

Electronic mail allows people to communicate across vast distances in terms of both location and time. Because email is often used to bridge these distances, many "socialization cues" used in more traditional conversation, for example in a face to face meeting, are absent. Because these cues are missing, it is frequently difficult to judge appropriate phrasing of an email message, or even if email is the most appropriate means for a particular communication need. Further, it is very difficult to determine when to expect a response to an email message.

Likewise, many organizations, including families and businesses, are geographical dispersed. In contrast, members of organizations that are located physically in close proximity develop an "understanding" of one another's behaviors through complex verbal and non verbal interactions. For example, it may be well known that a fellow employee will generally not be at work before 9 AM because he drops a child off at a day care facility which doesn't open until 8:30.

Another common understanding occurs when someone is up against a deadline, such as a budget presentation in two days. When distance, including time and physical separation, is involved, such understandings may be lacking or diminished, and communications, including email, are less efficient.

There are at least three factors about email usage that could be useful to know about an intended email recipient. First, how quickly does he typically read email? Second, how quickly does he normally respond to email? Third, does his current email load (relative to his typical email load) suggest that he is currently experiencing email overload and is going to be less responsive than usual to email? Taken together, these factors are referred to as a user's "email receptiveness."

For example, some people read email frequently throughout the day, and even check-in at night or in the morning before coming into the office. Others only read email at the beginning and end of the day. Having some expectation of when a person is likely to see an email message sent to them may help a sender decide if email is a good communication channel to use for a particular issue.

Also, people vary in terms of how responsive they typically are for email. Over time, one may realize that some people are very responsive to email, whereas others may take longer to respond. Knowing this information may help a sender decide whether email is an effective medium to use to communicate with this person for a particular topic. According to an aspect of the invention, an email service can monitor how quickly a person responds to email (e.g., tracking the time between receiving a message and when the person responds to it) and indicate to people who want to send email to this person a measure of how responsive the user typically is to email.

Furthermore, a person's receptiveness to email may vary over time due to a variety of conditions. For example, when a person goes on vacation, she may not read and respond to email until she returns. Or, some people may place responding to email at a lower priority during some impending deadlines. These variations from typical email receptiveness can be detected by the user's email service, and an indication can be given to people who want to send this person email that she is currently not as responsive as usual to email. This may be useful to the prospective sender, who (depending on the particular issue) may decide to use a different communication medium, may decide not to bother the person with email, or may form an expectation that the person may take longer than usual to respond.

Therefore, in order to overcome such deficiencies with email, it is desirable to provide an email sender with a gauge of the email receptiveness of a recipient. This gauge can be provided before the sender composes the message. For example, how likely is an intended recipient to read a new email message within a certain period of time? With information on email receptiveness, an email creator may, for example, tailor expectations of a recipient's receptiveness. A wide range of alternative behaviors becomes available with access to such information. Examples include changing time references within an email message, choosing another form of communication, for example paging the recipient, and directing a message to another party who may be more responsive. With information on email receptiveness, an email creator may improve the communication, for example, adjusting the form and/or the content of the communication, increasing the likelihood of not just communicating, but achieving the goal of the communication.

One embodiment of the invention comprises three components. A mechanism for tracking a user's email usage is described. Email usage refers broadly to measures of amount of unread email, patterns of when email is read, how quickly email is responded to, how email is filtered, etc. In one embodiment the mechanism for tracking email usage comprises email application 122 (FIG. 1C).

A mechanism is also described for analyzing the usage over time to discern the user's typical patterns of using email and to detect any changes from the typical pattern. A mechanism is also described for indicating the current status of a user's email usage pattern to people who want to send email to this user. This indication may help senders decide whether they should choose some other communication media, or may help the sender form expectations of when to expect an email response from the user.

Figure 8:
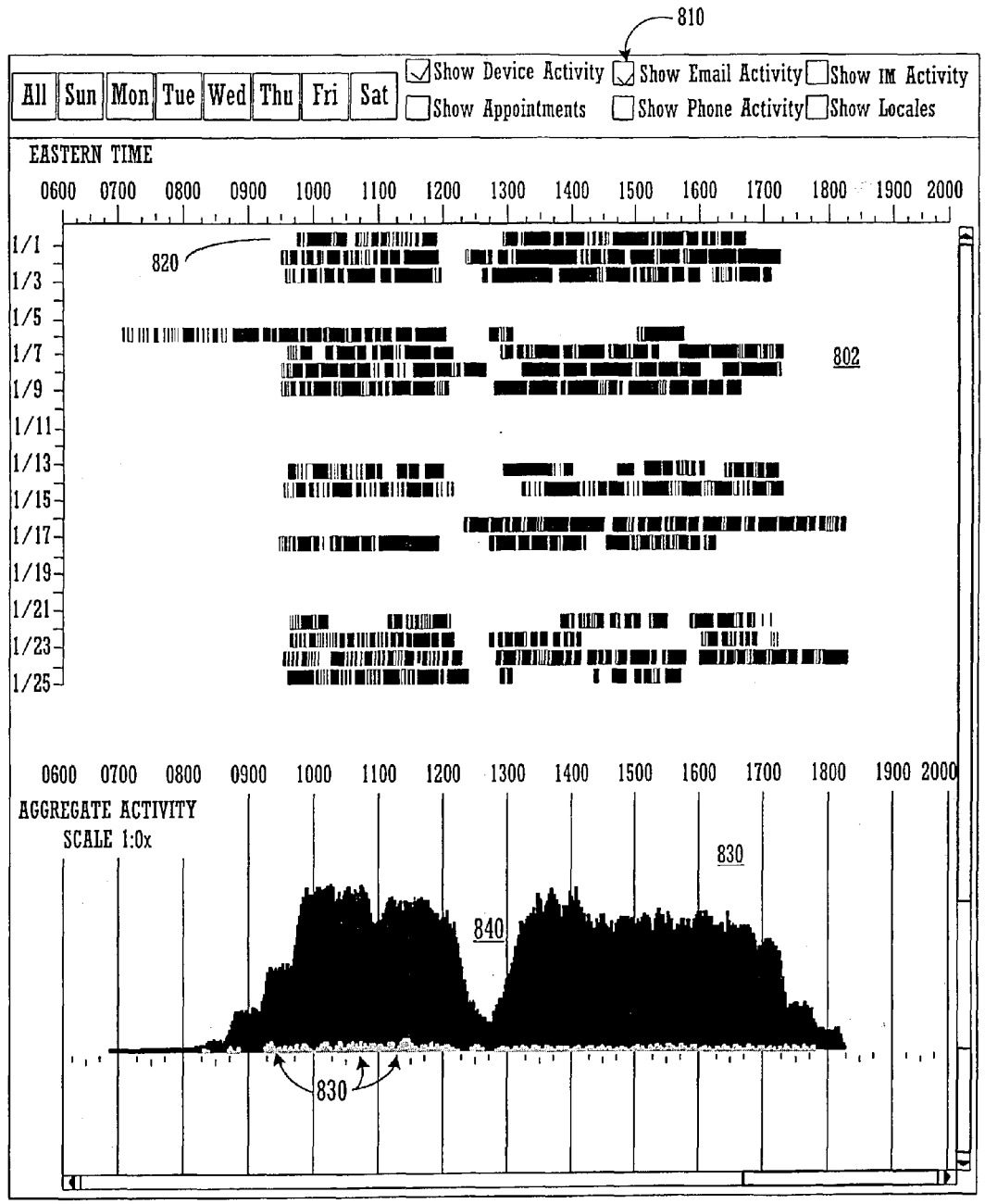
FIG. 8 illustrates an exemplary "actogram" and histogram of aggregated activity with email activity information added, according to an embodiment of the present invention.

Regarding a user's email usage, FIG. 8 illustrates an actogram 800, which graphically represents some of an exemplary email user's activities for approximately one month, according to an embodiment of the present invention. Radio button 810, part of a GUI, is checked herein, indicating that email activity is selected (as is device activity, such as from input device 120; FIG. 1C). As seen in FIG. 2A, radio buttons 210 effectuate via GUI selecting for display of other activities beside email usage including device (e.g., keyboard, mouse, etc.) activity, telephone activity, IM activity, appointments, and locales as well. It is appreciated that other activities can be selected for display by incorporation into the GUI deploying radio buttons 210 and 810. For instance, web browser 124 (FIG. 1C) can be displayed to allow selection for display of web browsing activity.

Again referring to FIG. 8, the top portion of actogram 800, section 802, illustrates activity of an email user in one minute segments versus time per day. More particularly, for each one minute period through a day, if there is recordable activity, a visible "tick" mark is placed in region 802 corresponding to that day and time.

Figure 10:
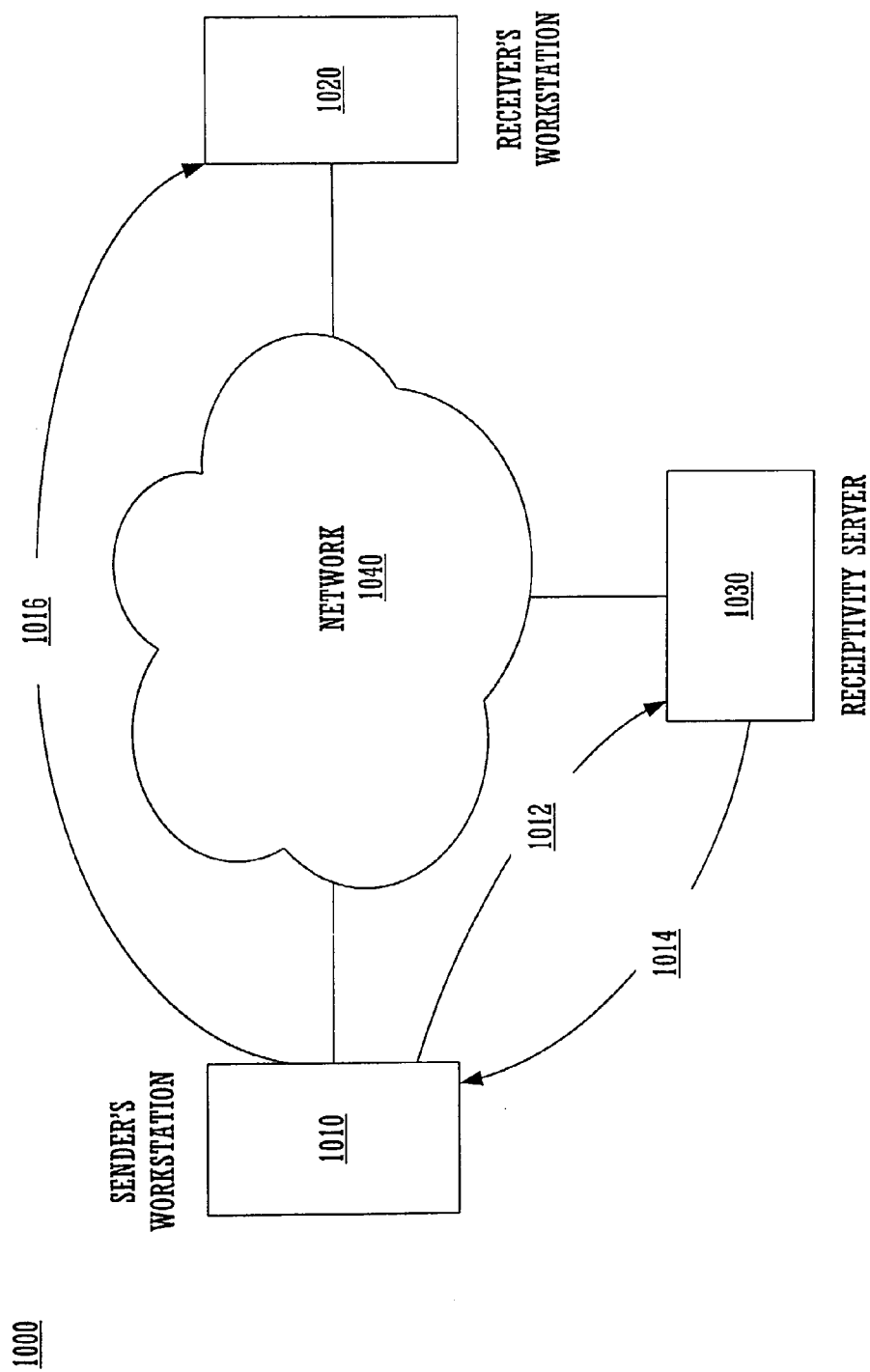
FIG. 10 illustrates an exemplary system of networked workstations, a server and an exemplary communications sequence, according to an embodiment of the present invention.

Recordable activity may include a wide variety of activities which generally may be captured or recorded electronically, for example computer keystroke actions and mouse movements, telephone activity (e.g., input device 121, telephone 125; FIG. 1C), specific program actions, e.g., sending email, web browsing (e.g., email application 122, web browser 124; FIG. 10) and the like. It is appreciated that such activity may be recorded separately and displayed in a multi-dimensional format, for example using different colors to signify each type of activity, in accordance with an embodiment of the present invention.

In exemplary actogram 800, line 820 may be interpreted as showing a user beginning activity for the day "½" at approximately 9:30 a.m. Line 120 also shows a period from approximately 11:45 AM until 12:45 PM in which no activity was logged. This particular user may have left his office for lunch during this time.

Region 830 of actogram 800 illustrates aggregate of user activity. It is appreciated that region 830 may represent more or fewer days than are displayed in region 810, according to an embodiment of the present invention. Region 830 is a histogram by time of the tick marks in region 810. It is to be appreciated that other methods of aggregating historical user data are well suited to embodiments of the present invention. By means of such aggregations, typical user behavior and email usage may become apparent. For example, the "gap" 840 in accumulated activity (region 830) between 12 noon and 1 PM (1300 hours) indicates that this user generally takes a break during this period, presumably to eat lunch.

Exceptions to normal behavior may be quite informative as well. In line 850, activity is recorded approximately two hours earlier than is typical. From this information, it may be inferred that the user was engaged in some manner of "deadline behavior," e.g., preparing for an important meeting. It is likely that this user would not welcome interruptions or most interactions, e.g., email and telephone calls, not directly related to this preparation.

Another illustrative deviation from expected behavior occurs on line 860. Line 860 indicates that no activity was logged until approximately noon. This is in marked contrast to a historically typical start time of 8:30 to 9:30. At ten AM on the morning represented by line 860, without advance knowledge of the user's schedule, it was clear that the day did not correspond to typical behavior, and it was highly likely that the user would not be responsive to email (or to telephone calls, etc.) sent at that time.

Embodiments of the present invention may make use of similar present and historical activity logs to make predictions of a user's email receptiveness.

There are many different measures that may come into play in tracking a user's email usage. At one level, the system could track the average number of unread email messages in a user's inbox. This could be accomplished by sampling the number of unread email messages in his inbox many different times throughout the day and calculating an average number of unread messages over the number of samples taken in a day. Over time, users would probably exhibit a typical average of unread email messages, which could be used to detect any changes from the typical value. For example, if a user went on vacation and stopped reading email for a few days, that user's average unread messages would probably quickly show up as larger than normal. In another embodiment, such tracking, sampling, calculating, and detecting of voicemail can provide similar information regarding the user's telephone.

There are a number of refinements to this measure of email usage. It may be more valuable to normalize the number of unread messages to the total number of messages in the user's inbox. It may be important to account for the fact that email usage is dependent on the time regions when the user is actually using a computing device and has access to email. For example, measuring the number of unread messages that accumulates in a user's inbox while he is asleep may not give an accurate indicator of the user's receptiveness to email (although it may give some indication of overall email traffic). Several methods could be used to account for this variation, including that it may be useful not to include samples when the user typically does not interact with email (e.g., when asleep at night) and it may be useful to only compare email usage patterns during comparable time regions of the day (e.g., the amount of unread email accumulating in a user's inbox at 2 am would, typically compare consistently with other days at the same time) and it may be useful to average email usage measures over an entire day so as not be too sensitive to variations within the day.

In one embodiment, the system can measure how much attention the user is devoting to reading email. The system measures how much time the user spends reading the particular email message. This assumes models could be built that estimate the amount of reading time generally required for a given length of email. The goal would be to distinguish if the user was just quickly browsing email or actually reading through it.

A different measure of email usage can also be receptiveness to received email. That might be the average measure of time between receiving an email message and sending a reply to it. For analytical purposes, one would need to delete (or somehow account for separately) any messages not responded to from this calculation. Again, over time, users would probably exhibit a typical average in email response time, which could be used to detect any changes from the typical value In one embodiment, the system can calculate this receptiveness measure for different subsets of the data. For example, one may want to correlate a user's response time to attributes of the message. One may want to measure the historical receptiveness of the user to only messages from a particular sender. One may want to correlate email receptiveness to the length of email messages. Or, one may want to measure receptiveness according to the groupings for which the email receiver has set up email filters. Email receivers often filter their email according to whether the message is addressed solely to them, addressed to a distribution list that they are a part of, is from a select list of senders, etc. Thus, by determining which group the email message that one wants to send would be filtered into, then the system calculates the user's typical response time only for messages in that same group.

Taking together the amount of unread email, the email receptiveness, and whatever other measures of email usage are calculated, the system can combine them into one indicator of email receptiveness. Note that many of these measures can be calculated at the email server side without requiring any interaction with the email client. Some measures (e.g., those that involve understanding the user's mail filtering) may require information from the email client side. Similar performance can be attained for other media such as telephone, etc., for instance generating a measure of telephonic or other media receptiveness by appropriate means.

Figure 9:
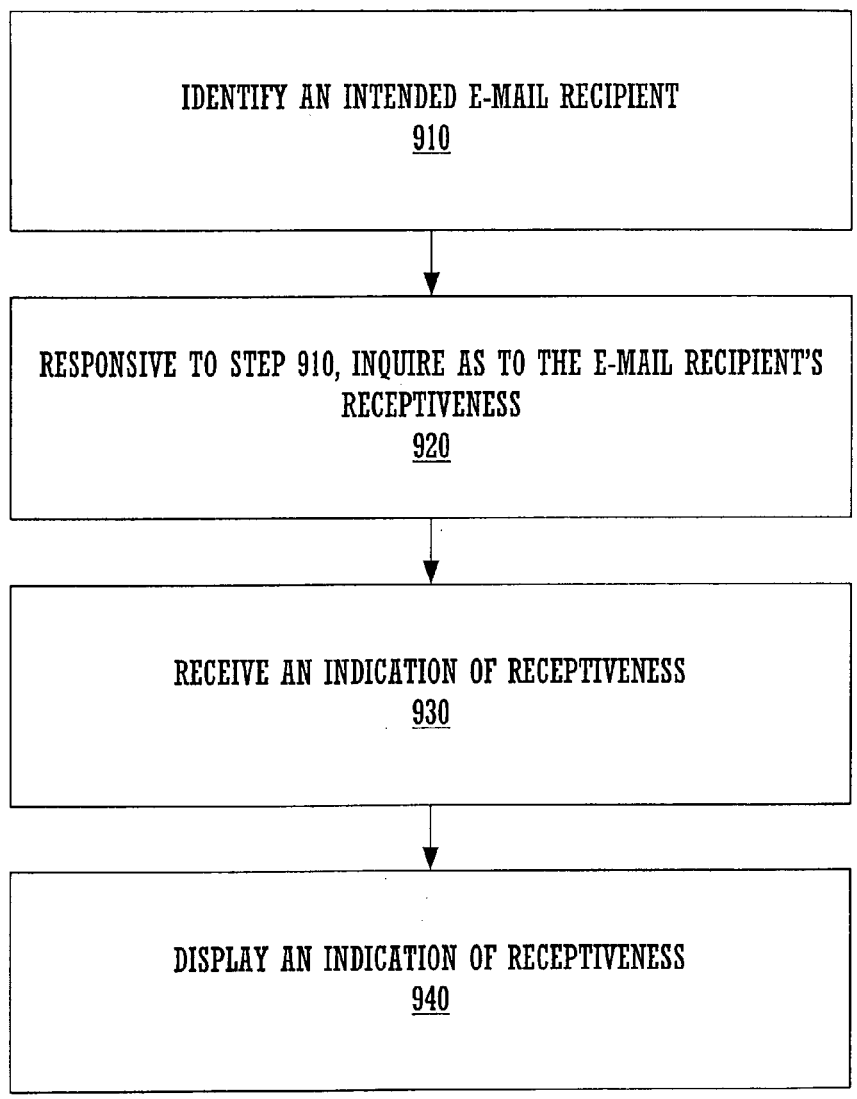
FIG. 9 is a flow chart for a computer implemented method of indicating email receptiveness, according to an embodiment of the present invention.

FIG. 9 illustrates a flow chart for a computer implemented method 900 of indicating email receptiveness, according to an embodiment of the present invention. Upon calculating some measure or combination of measures of the user's typical amount of unread email, email receptiveness, or other measures of email usage, the present invention indicates the current status of the user's email usage pattern (email receptiveness) to people who may want to send email to the user.

In step 910, an email recipient is identified. Such identification may take a variety of forms. For example, an email originator may type a nickname of an email recipient into a workstation, for example, sender's workstation 1010 of FIG. 10. Other examples include selecting an email address from a list of contacts or entering a complete email address in to an email application.

In step 920, a sender's workstation inquires as to the email recipient's receptiveness. For example, sender's workstation 1010 of FIG. 10 may send an inquiry message to an email receptiveness server, for example to receptiveness server 1030 of FIG. 10. It is appreciated that embodiments of the present invention are well suited to a wide variety of inquiry message types, formats, and transport protocols, including "instant messaging," virtual connections and store and forward arrangements. Further, embodiments of the present invention are well suited to a wide variety of implementations of an email receptiveness server, including for example, stand-alone, incorporated into an email server, as part of a file server, or as part of an email recipient's workstation. In addition, embodiments of the present invention are well suited to a wide variety of network topologies, including for example locating an email receptiveness server within an intranet, as a part of a LAN, WAN or MAN, or as a general server on the internet.

In optional step 930, an indication of email receptiveness may be received at an originator's workstation, for example sender's workstation 1010. According to an embodiment of the present invention, the indication may be rendered into a graphical representation, for example a color-coded scale in which green indicates normal receptiveness and red indicates poor receptiveness. It is to be appreciated that email receptiveness may be measured, quantified, represented and/or displayed in a wide variety of ways in accordance with embodiments of the present invention.

In step 940, an indication of said email receptiveness is displayed, for example within a GUI deployed upon sender's workstation 1010. Seeing this information can help prospective senders decide if they should use some other communication medium, or it can help them form an expectation of when they would expect an email response from the user. It is appreciated that in another embodiment, by a process similar to process 900, however tailored for other particular communications medium, determination of receptiveness to media other than email can also be effectuated. Further, such a process can provide an indicator of a user's reachability, as well.

This "email receptiveness status" could be shown in a general awareness tool (e.g., an instant messenger buddy list). Since such awareness tools typically show the state of the user (e.g., whether logged on, idle time at the computer), email receptiveness could be integrated as another piece of awareness information displayed in the buddy list. One could construct relatively abstract representations (e.g., red, yellow, or green light) or more precise displays (e.g., a numerical difference between the user's current and typical email receptiveness status). Another place where this email receptiveness status information can be embedded is in the email client. If a sender is composing an email message to a user, once the sender fills in the user's name, the email client can indicate the current email receptiveness for that addressee. Similar representations can also be promulgated to indicate receptiveness to media other than email, as well as reachability.

Preferably, email receptiveness may be treated as a special type of awareness information that can be calculated by an email service (or the email service can provide APIs that enable it to be calculated), and should be managed by an awareness service (e.g., rhythm service 100; FIG. 1A, 1C) such that any client application that wants to access email receptiveness can do so and integrate it in its application. The awareness service can integrate a report of email receptiveness with other types of awareness information, for example, absences scheduled in the user's calendar and user activity at a different location corresponding to a different email address. Another embodiment similarly integrates reports of receptiveness to other media besides email, as well as reachability.

With information on email receptiveness, an email creator may, for example, tailor expectations of a recipient's receptiveness, which may influence the sender's email protocol. A wide range of alternative behaviors becomes available with access to such information. Examples include changing time references within an email message, choosing another form of communication, for example paging the recipient, and directing a message to another party who may be more responsive. With information on email receptiveness, an email creator may improve the communication, for example, adjusting the form and/or the content of the communication, increasing the likelihood of not just communicating, but achieving the goal of the communication. In other embodiments, this is applicable to other media and corresponding behaviors as well.

FIG. 10 illustrates an exemplary system 1000 of networked computers upon which embodiments of the present invention may be practiced. Although the system 1000 is described herein with respect to email, it is appreciated that this or a similar system can effectuate promulgation of awareness information of media besides email, such as computer usage, web browsing, personal device usage, IM, and telephonic communication among others. Such information can be used to infer a user's reachability.

A user of sender's workstation 1010, for example a personal computer, desires to send an email communication to a user of receiver's workstation 1020, for example a Unix-based computer. Network 1040 connects sender's workstation 1010 and 1020, as well as email receptivity server 1030. Email receptivity server 1030 can be a rhythm service (e.g., rhythm service 100; FIG. 1A, 1C). It is appreciated that network 1040 may be virtually any networking arrangement, including the internet, an intranet or various other types and/or combinations of networks in accordance with embodiments of the present invention.

Sender's workstation 1010 recognizes and identifies an email address for a user of receiver's workstation 1020. It is appreciated that an email address is generally associated with an individual, rather than a workstation. However, it is also to be appreciated that a majority of email recipients generally are very consistent in accessing email from a single workstation. Furthermore, the majority of workstations, especially in commercial establishments, are used by a single user, for example either by convention, e.g., located in one's office, or through the use of well known security methods, for example power on passwords.

Sender's workstation 1010 identifies or resolves the email address in a variety of well known ways, including for example looking up a nickname, choosing from a contact list menu or receiving a complete email address.

Sender's workstation 1010 then sends a message 1012 to email receptivity server 1030, to inquire as to the email receptiveness of the identified email recipient (a user of receiver's workstation 1020). This information can be stored and maintained dynamically within a database. It is appreciated that in another embodiment, server 1030 can provide information on receptiveness to email, as well as to other communications media, and that this information can also be databased.

Email receptivity server 1030 prepares and sends a response 1014 to sender's workstation 1010. Email receptivity information contained within response 1014 is presented to the user of sender's workstation 1010 in some visible mechanism. It is to be appreciated that non visual representations of email receptivity information, including for visually impaired persons, are well suited to embodiments of the present invention. Equipped with such email receptivity information, the user of sender's workstation 1010 composes and sends email message 1016, which is accessed by receiver's workstation 1020. In another embodiment, visual and/or non-visual indicia of receptivity to media other than email may also be sent.

Message 1012 and response 1014 are preferably transmitted by "real time" or via low-latency networking protocols, for example "instant messaging" protocols or virtual connections. It is to be appreciated, however, that embodiments of the present invention are well suited to virtually all forms of networking communication, including store and forward protocols.

According to an embodiment of the present invention, receptivity server 1030 may be a process operating on receiver's workstation 1020. Such an arrangement may have advantages in collecting behavioral information and security access control when compared to physically separate implementations of a receptivity server.

Figure 11:
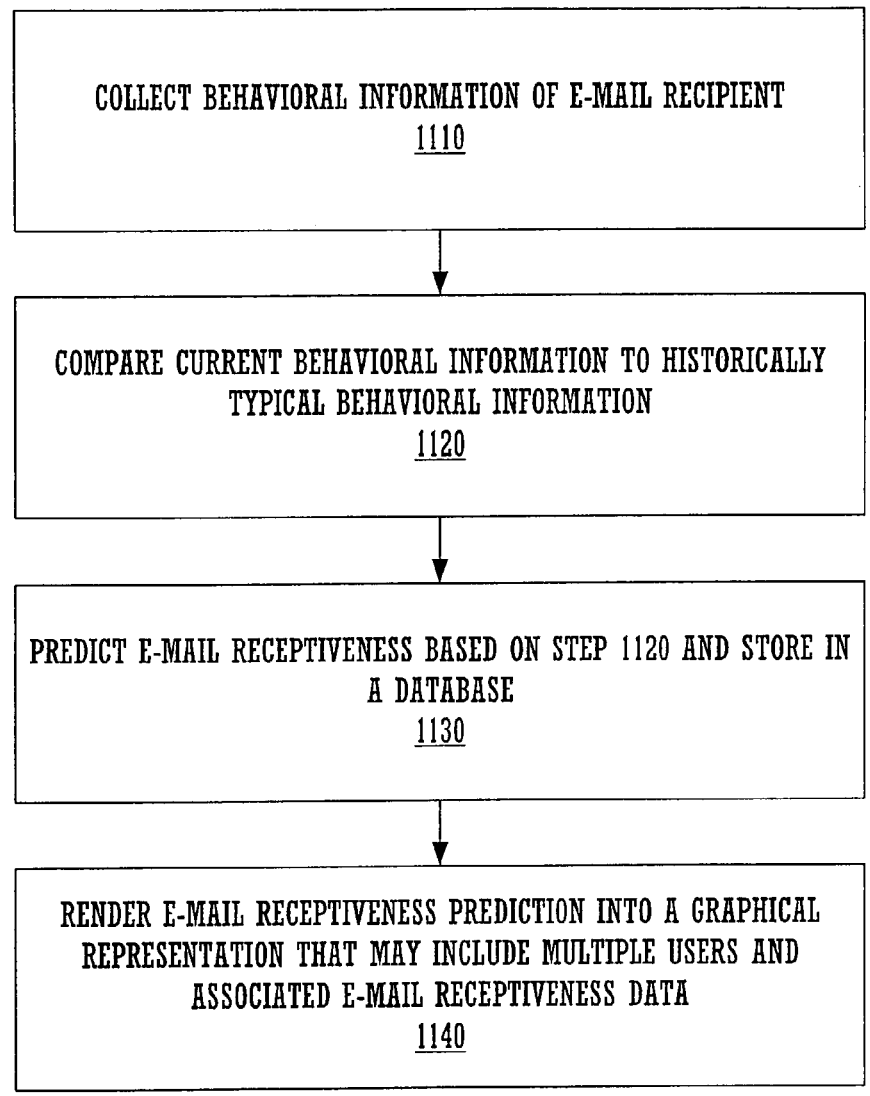
FIG. 11 illustrates a flow diagram for a computer implemented method of predicting email receptiveness, according to an embodiment of the present invention.

FIG. 11 illustrates a flow diagram for a computer implemented method 1100 of predicting email receptiveness, according to an embodiment of the present invention. It is appreciated that a prediction process of receptiveness to other communication media according to another embodiment can be inferred by reference to FIG. 11.

In step 1110, information on the behavior of an email recipient is collected, e.g., by a computer or server system. Such information may take a vast array of forms in accordance with embodiments of the present invention, and may include, for example, computer interaction activity, e.g., keystrokes, pointing device (e.g., mouse) movement and the like, calendar information stored on computer readable media, and information on telephone activity, including office, home and mobile telephones. Other information may include electronic access controls, e.g., badge accesses and other security monitoring, power monitoring devices, e.g., "turn the lights off when someone's out of the office," and email program activity, e.g., accessing "new" email or sending an email. Other information may also include location information, e.g., where is a person working (office, satellite office, home, road) and the like.

More particularly, embodiments of the present invention measure the number of email messages in a user's email in-box, e.g., unread messages, the average time the user spends reading the email messages, and/or the average time the user spends in replying to an email message. This information is collected about a user over time. This is done for all users. Analogous information is applicable to other media; for instance, voicemail applies in some similar ways to telecommunications.

In step 1120, current behavioral information is compared to historically typical behavioral information in order to detect any deviations. It is to be appreciated that a great many types of comparisons may be made in accordance with embodiments of the present invention. Example comparisons include comparing a current number of unread email messages to an average number of unread email messages and comparing a current period of idleness to a period of idleness that occurred on the same day last week.

In optional step 1130, a prediction of email receptiveness may be made based upon a comparison made in step 1120. This indication may be stored in the database. For example, if historical behavioral information indicates low activity between noon and one PM on weekdays, and today's information reported at 12:30 PM indicates low activity since noon, a prediction may be made that a new email message will not be read for at least 30 minutes. Alternatively, if a user's normal amount of email messages in the inbox is ten and the current data indicates there are 50 messages in the inbox, then a good assumption is the user is on vacation or otherwise not routinely read the emails. Also, if a user is merely scanning emails, rather than reading them carefully, an assumption can be made the user is relatively busy and may not be receptive to new email messages.

In optional step 1140, a prediction of email receptiveness may be rendered into a graphical representation. This representation may include many users with associated email receptiveness data. It is to be appreciated that a wide variety of graphical representations are well suited to embodiments of the present invention, including for example, color coded scales, activity graphs, clock-face representations, emoticons and the like. These graphics are equally applicable to render estimates of receptiveness to communications by other media.

It is to be appreciated that method 1100 may operate within a single device, for example receiver's workstation 1020 of FIG. 10, or portions of method 1100 may operate across a network of computer systems in accordance with embodiments of the present invention.

Figure 12:
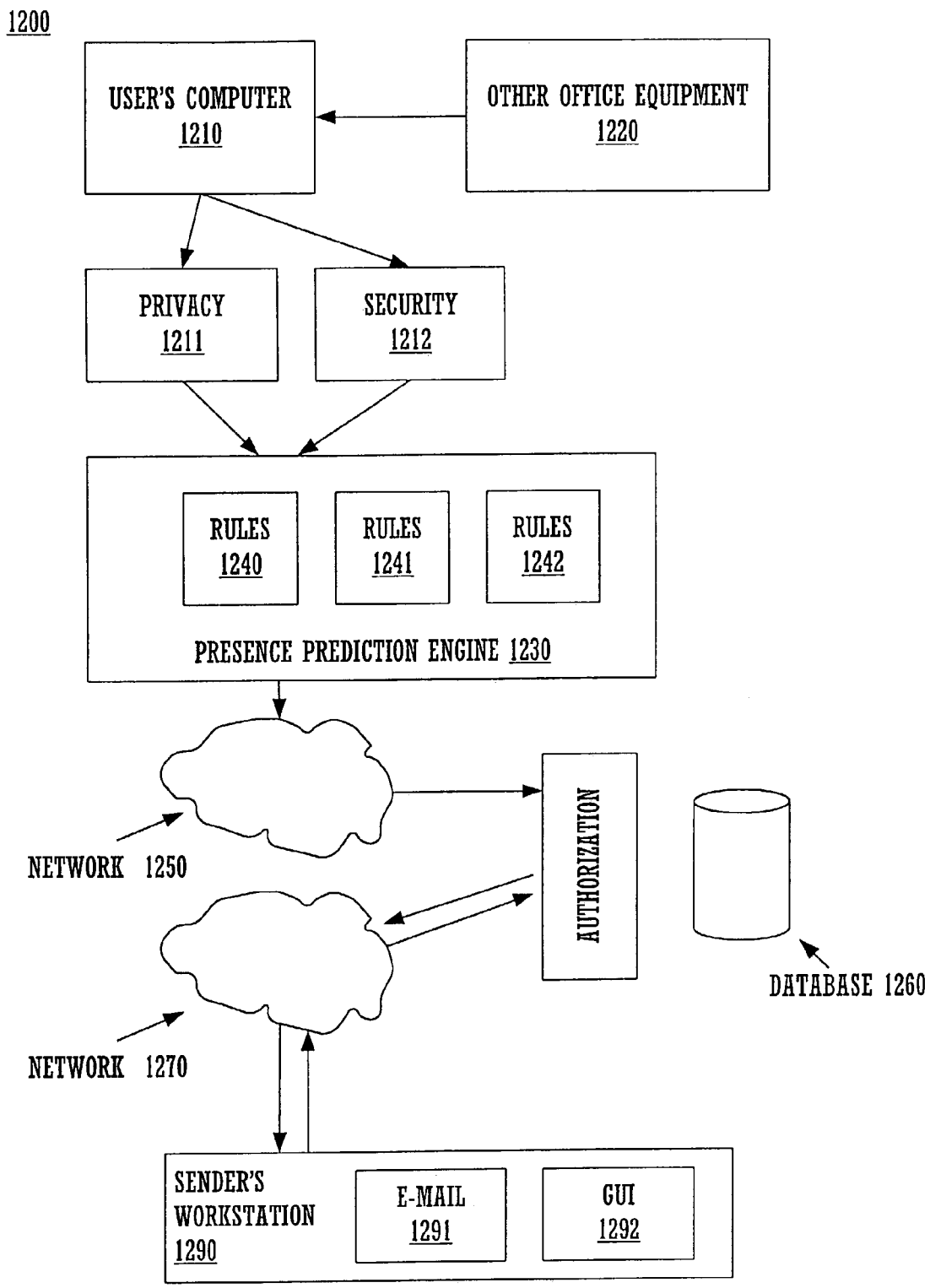
FIG. 12 illustrates a data flow diagram, according to an embodiment of the present invention.

FIG. 12 illustrates a data flow diagram 1200 of an email system in accordance with an embodiment of the present invention. Although the data flow diagram 1200 described herein respects email, it is appreciated that a similar data flow can effectuate promulgation of awareness information of media besides email, such as IM, and telephonic communication, etc.

Presence detection engine 1230, which may be software, gathers information about the presence, workload and/or activities of a user. Rules 1240, 1241 and 1242 control various aspects of the gathering, for example how often to collect user activity information and/or how often to report activity information to a receptiveness server 1261. Presence detection engine 1230 may operate on a user's computer 1210 or workstation, for example as a separate process from an email or other program. Alternatively, presence detection engine 1230 may operate on another computer, for example a corporation's email server.

User's computer 1210 gathers and reports user activity, for example key strokes, mouse movement (e.g., input device 121; FIG. 1C) or specific program actions, e.g., sending email, to presence detection engine 1230. Privacy filter 1211 and security filter 1212 may filter user information according to user selectable parameters. Privacy filter 1211, for example, may implement user-specifiable "anonymity" features. For example, a user may restrict some users of a receptiveness server 1261 from obtaining detailed activity information. As another example, some users may only have access to receptiveness predictions. Security filter 1212 may implement institutional (e.g., corporate, etc.) required access controls.

It is appreciated that user's computer 1210 need not be "on" or running a specific program for arrangements of computers and/or networks to practice embodiments of the present invention. As discussed in greater detail below, an inquiry of receptiveness may be made to a separate computing entity. Such a receptiveness server 1261, e.g., database 1260, may, for example, interpret lack of communication from user's computer 1210 and/or presence detection engine 1230 as a sign of user inactivity (e.g., idleness).

Other office equipment 1220, for example a telephone or a power-management presence detector, may provide information to email user's computer 1210 as supplemental presence and/or activity information. In turn, such supplemental information may be processed through privacy filter 1211, security filter 1212 and according to rules 1240-1242 in presence detection engine 1230.

Presence and/or activity information may be transmitting over a network 1250 to a receptiveness database 1260 for storage. Network 1250 may be, for example, a LAN, a WAN, a corporate intranet, the internet or various other networking arrangements, including communication channels within user's computer 1210. Database 1260 may further be able to process presence and activity information to produce a prediction of email receptiveness. Alternatively, database 1260 may store a prediction of email receptiveness generated elsewhere, for example on user's computer 1210 or on a corporate email server. Database 1260 may take the form of an internet web server. Database 1260 and network 1250 may be part of user's computer 1210, according to an embodiment of the present invention. Authorization engine 562 may serve to limit access to database 1260 to authorized users. Authorization engine 1262 may implement differing levels of access to database 1260 for inquiries versus reports.

Sender's workstation 1290 may include an email application program 1291 and a GUI 1292. In response to sender's entry of an email address, a message may be sent via network 1270 to database 1260. Network 1270 may be, for example, a corporate intranet, a LAN, a WAN or the internet. Database 1260 may respond with a measure of receptiveness, which may be displayed within graphical user interface 1292. Alternatively, when a list of email recipients and/or contacts is displayed on GUI 1292, inquiry may automatically be made to database 1260. GUI 1292 may be updated with various metrics indicative of an email recipient's status. Examples of such metrics may include recipient's location, how long at present location, time since last recorded activity and a prediction of email receptiveness, etc.

Figure 13A:
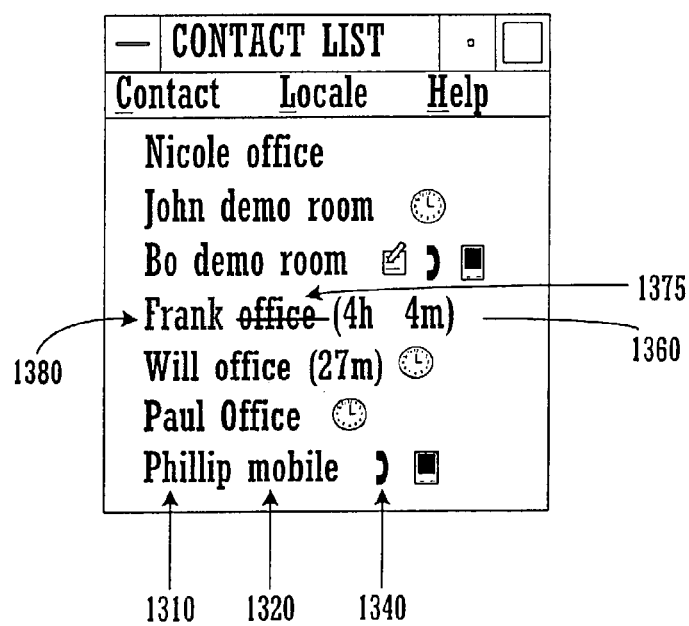
FIG. 13A shows an exemplary graphical user interface of a contact list application program showing a list of contacts and associated awareness information, according to an embodiment of the present invention.

FIG. 13A shows an exemplary screen image 1300 of a contact list application program showing a GUI comprising a list of contacts and associated awareness information, according to an embodiment of the present invention. This awareness information can be used to gauge the corresponding user's email receptiveness and/or receptiveness to other media contact. A given name or nickname is displayed on the left of each line 1310. Next on each line is a best known location information 1320. Icon 1340 indicates that a contact, for example "Philip" is currently (or very recently has been) using a telephone. Icon 1350 indicates that a contact is using a mobile computing device, for example a hand held computer.

Icon 1330 indicates that a contact, for example Paul, has a scheduled calendar event at present. This information may be obtained by reference to an electronic datebook. Some users, for example Paul's manager, may receive more information about some of Paul's meetings. For example, Paul's manager may have access to the entire datebook entry. Other users may only have access to an indication that a meeting is scheduled, for example via icon 1330.

Display image 1370 "(4 h 4 m)" on line 1360 may indicate that a particular contact ("Frank") has not been in communication with a receptiveness server for a period of time. If such a period of time is of sufficient duration, a receptiveness server (e.g., rhythm service 100; FIG. 1A, 1C) may determine that a "best known location" is suspect. Display image 1375 (the word "office" with a strikethrough) indicates that the last "best known location" for Frank is suspect and should not be relied upon.

Further on line 1360, the contact name 1380 ("Frank") is displayed in a color, for example red, that indicates a prediction of low or poor receptiveness to email. Such a prediction may be generated, for example, by comparing Frank's historically typical behavior (e.g., usually in the office active on a computer on weekdays) with present behavior (no activity for over four hours). It is appreciated that these graphics can be readily applied to indicate receptiveness to other communication media as well.

Figure 13B:
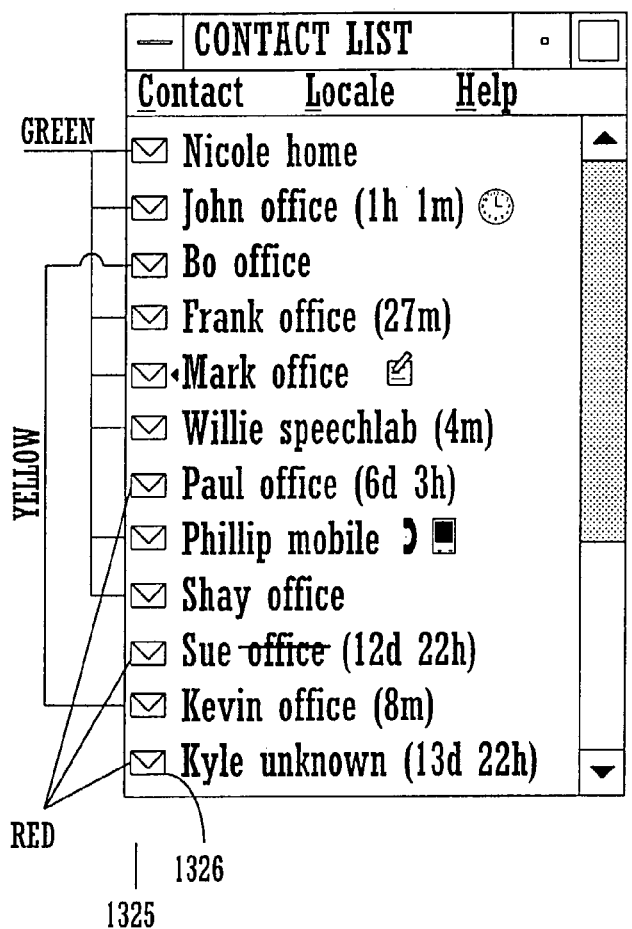
FIG. 13B shows user email receptiveness as color-coded levels of a letter icon, according to an embodiment of the present invention.

FIG. 13B shows user email receptiveness as color-coded levels of a letter or envelope icon, according to an embodiment of the present invention. Display image 1315 of a contact list is generally similar to display image 1300, including a list of names or nicknames, locations, etc. A letter (envelope outline) icon, for example icon 1326, has been added to the display as a first column 1325. The icons of column 1325 indicate email receptiveness of the corresponding users via a color code. For example, a letter icon displayed in green represents typical email receptiveness. Icons displayed in yellow may indicate an observed but relatively small deviation from typical email behavior, indicating a reduced level of email receptiveness. A red icon may indicate a substantial deviation from typical email behavior and a correspondingly poor level of email receptiveness. Similar graphics are also readily applicable to indicate receptiveness to other communication media as well.

Figure 13C:
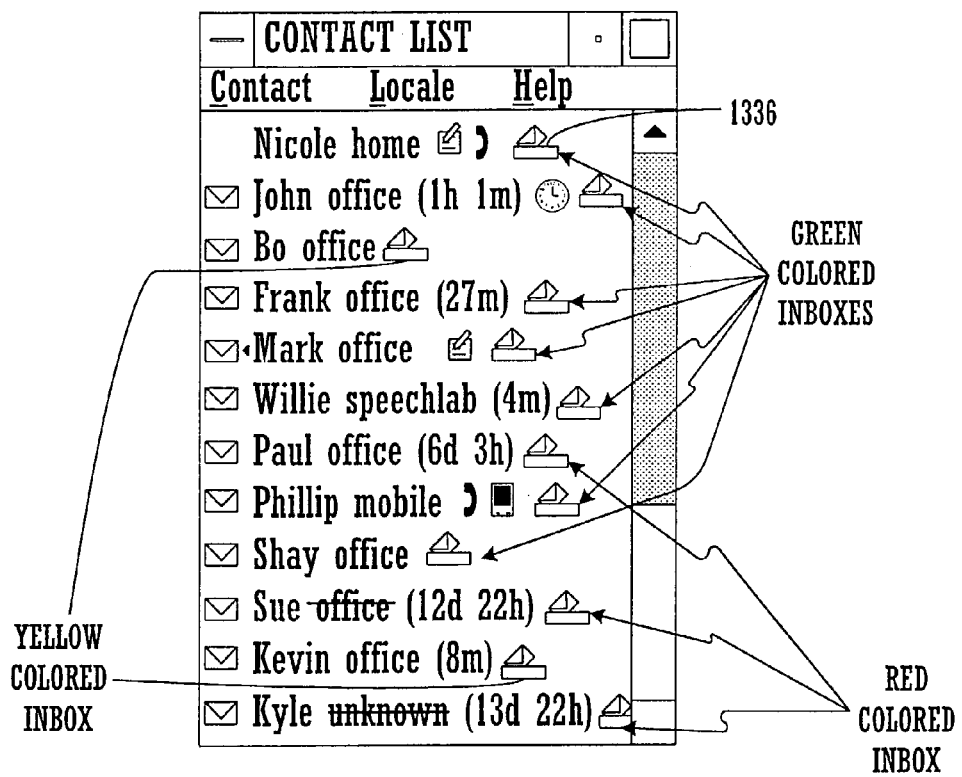
FIG. 13C shows user email receptiveness as color-coded levels of an inbox icon, according to an embodiment of the present invention.

FIG. 13C shows user email receptiveness as color-coded levels of an inbox icon, according to an embodiment of the present invention. Display image 1335 of a contact list is generally similar to display image 1300, including a list of names or nicknames, locations, etc. A color coded inbox icon 1336 (an envelope "dropping" into a mail slot) is added at the end of each entry line to indicate email receptiveness. More particularly, the color coding of icon 1336 represents a measure or combination of measures of a user's email inbox. Measurements may include, for example, relative size (compared to historically typical) of a user's email inbox (measured in bytes and/or number of messages), relative age of messages in the inbox and latency between receiving an email message and responding to the email message.

The inbox icons of display image 1335 indicate email receptiveness of the corresponding users via a color code. For example, an inbox icon displayed in green represents typical email receptiveness. Icons displayed in yellow may indicate an observed but relatively small deviation from typical inbox conditions, indicating a reduced level of email receptiveness. A red inbox icon may indicate a substantial deviation from typical inbox conditions and a correspondingly poor level of email receptiveness. Similar graphics are also readily applicable to indicate receptiveness to other communication media as well.

Figure 14A:
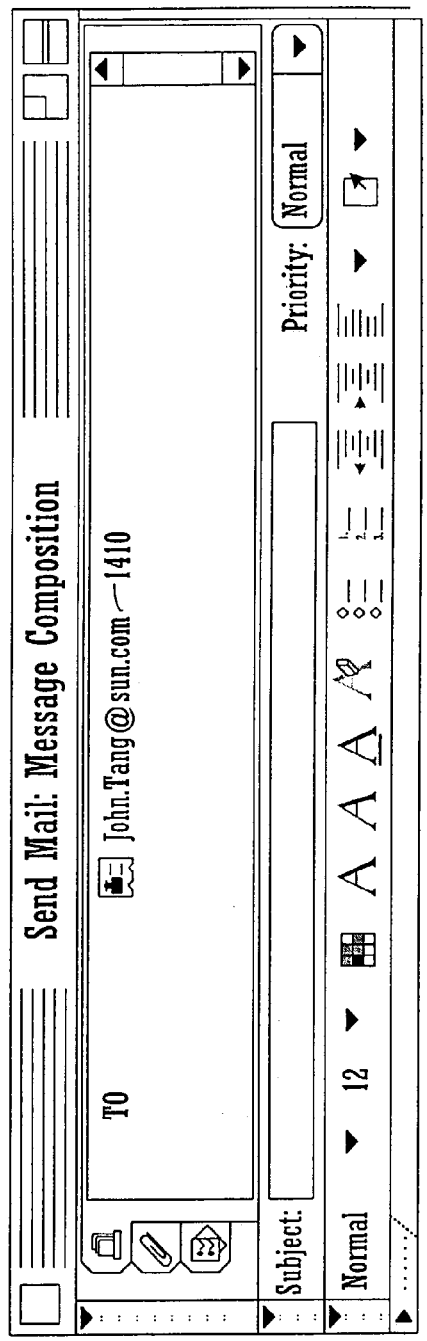
FIGS. 14A and 14B show a sequence of display images of an email program, according to an embodiment of the present invention.
Figure 14B:
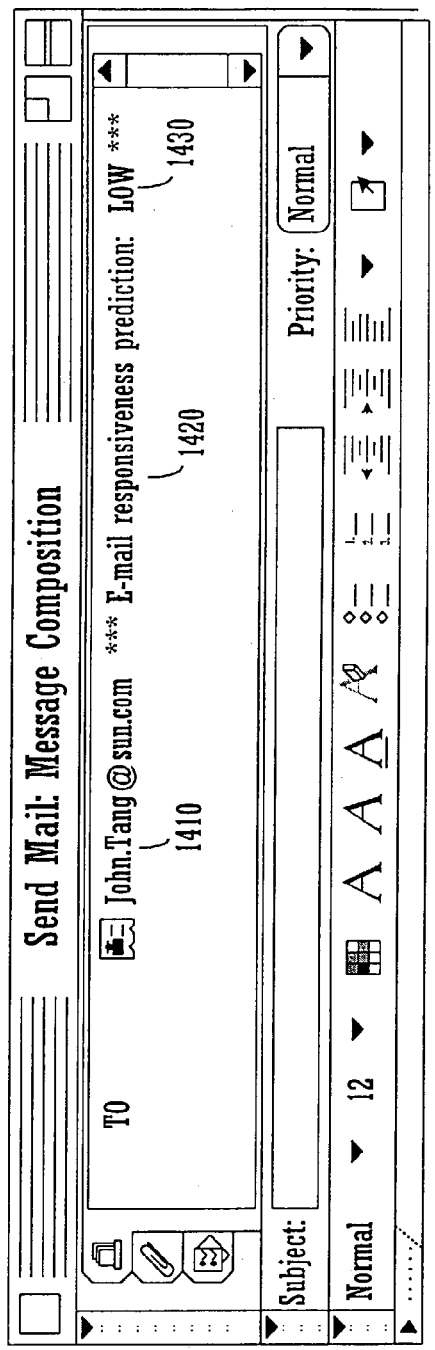

FIGS. 14A and 14B show a sequence of display images of an email program where email receptiveness information is integrated within an email application, according to an embodiment of the present invention. Similar display images are also readily applicable to indicate receptiveness to other applications as well. FIG. 14A shows display image 1400 of an email program, after the program has recognized an email address 1410. The address may have been typed in by a user, or selected from an address book or contact list. This image may correspond to a point in time immediately after step 1110 of FIG. 11.

Subsequent to identifying an email recipient's address, inquiry may be made to an email receptiveness server, and the server may respond with an indication of email receptiveness for the designated address 1410. FIG. 14B shows display image 1450 of an email program after the program has received a response from an email receptiveness server. Display image 1420 is a human readable indication of an email receptiveness prediction with a value 1430. In this example, email receptiveness is predicted to be "LOW." It is appreciated that other forms of displaying receptiveness information including icons, color encoding and the like, alone or in combination are well suited to embodiments of the present invention. The user of the email program can use indication 1430 to alter the contents of the message, or to use another avenue for communication. It is appreciated that the indication is displayed before any message composition is commenced.

Figure 15:
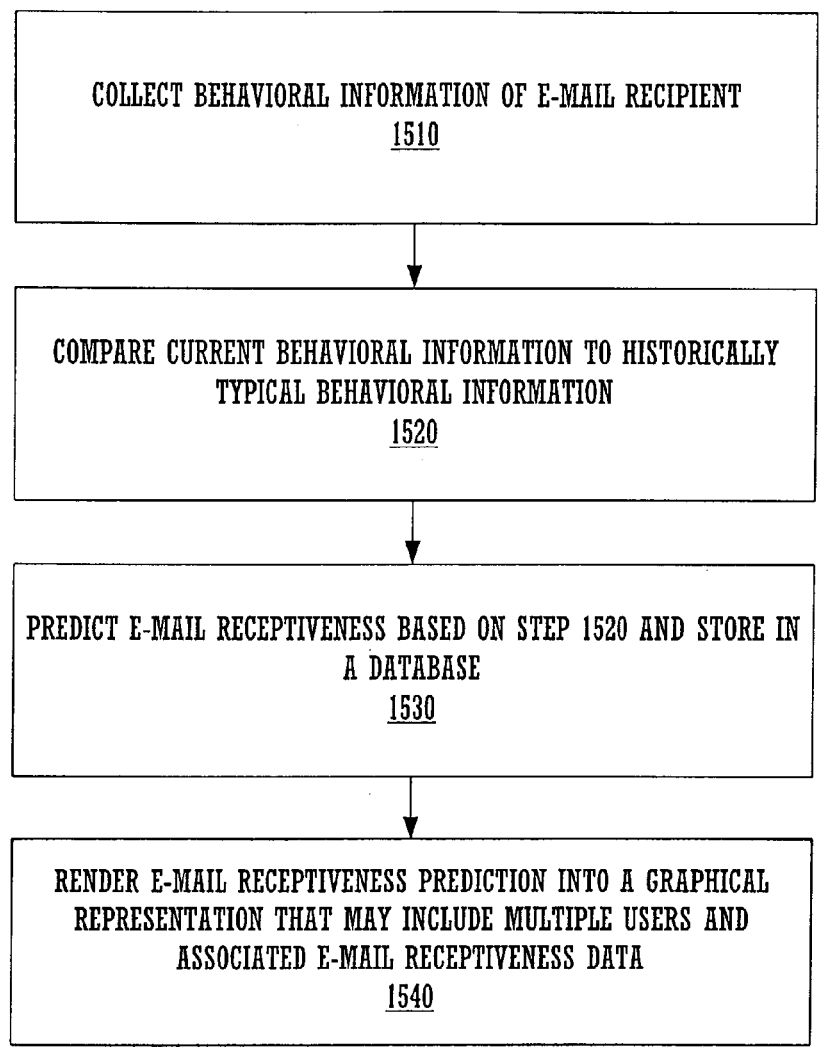
FIG. 15 is a flow chart of a computer implemented method for performing electronic messaging, according to an embodiment of the present invention.

FIG. 15 illustrates a flow chart of a computer implemented method 1500 for performing electronic messaging, according to an embodiment of the present invention.

In step 1510, a database including information about electronic mail receptiveness of a plurality of electronic mail users is maintained. Such information may include, for example, computer activity logs, telephone activity logs, electronic presence information, the number of email messages in a user's email "in-box," the number of unread email messages in a user's inbox, the average latency of an email message in an inbox prior to being read by a user and/or the average latency or time between receiving an email message and responding to the email message.

Step 1510 may implement several optional sub-processes, including, for example, periodically querying computer systems of the plurality of email users to obtain data from the computer systems. It is to be appreciated that embodiments of the present invention are well suited to "pushing" information to the database from the computer systems of the plurality of email users.

Step 1510 may also process the data collected according to predefined metrics in order to determine updated electronic mail receptiveness information of the plurality of email users. Such processing may determine whether an irregularity or deviation exists with an otherwise habitual behavior of the intended email recipient. Irregular behavior may be an indication of low or poor email receptiveness according to an embodiment of the present invention.

In step 1520, the database is queried to obtain email receptiveness information of a second email user. This inquiry may be in response to a request from a first email user (sender) who is considering sending email to the second email user (potential recipient).

In step 1530, an indication of email receptiveness is displayed within a graphical user interface of a computer system associated with the first email user, or sender. Preferably, such an indication is displayed within a display area or window of an email program.

In optional step 1540, a decision to transmit an email message to the second user (potential recipient) is effected by the indication of email receptiveness. For example, if email receptiveness is indicated as being low, an email message may not be sent. Alternatively, the message composition may change depending on the indication. Alternatively, the communication avenue and the message composition may not change, but the sender will not expect a message reply for some time assuming a low email receptiveness was indicated.

Exemplary Applications

Applications of Analysis to Coordinating Communications

By interpreting results of activities analysis and analysis of active and idle periods, a number of useful applications are enabled. In one embodiment, for a person whose activities are under analysis, typical arrival, departure, and lunch periods can be determined from the recorded activity. This information can be useful in deciding when are the best times to reach that person. Regular periods of longer or shorter activity durations can be determined from recorded activity. This can be valuable in determining what times are propitious for finding someone in their office to establish contact.

Where activity patterns show presence that occurs during appointments scheduled in the person's calendar, various explanations can be inferred. For instance, registered telephone activity during an appointment can mean that the appointment is a telephonic one, such as a teleconference. From such information, it can be inferred that the person may be available for email and/or IM communication.

Activity patterns show absence that is not scheduled in a person's calendar. Lunches can be one example. There can be other recurring, yet unscheduled events, such as an end of the week organizational gathering. Furthermore, some appointments require travel and preparation that causes a user to be absent for some amount of time before (and after) an appointment. Such absences are buffers that can be detected by reference to the person's rhythm data.

A person's activity patterns differ from one day of the week to the next. However, coordinating communications or other applications that use a person's activity patterns to predict or estimate a person's availability can easily apply an aggregate activity histograms for a particular day of the week (e.g., FIG. 3) and/or other day-specific data generated by embodiments herein.

By aggregating a person's appointments information, periods can be identified in which the person has a relatively high number of appointments. From this, it can be inferred that such times are not particularly optimal times to attempt to contact the person.

As discussed above, a person's use of rigidly scheduled public transit is reflected in their activity data. >From such data, a minimum amount of time the person remains available at the end of a workday can be estimated or predicted. Similarly, a minimum amount of time before which a person will not be available at the beginning of a day can also be so predicted.

Analysis of a person's activity can estimate the probability that a person will be active at any given minute for all the days of a work week. Furthermore, by narrowing the analysis to a particular day of the week, the probability that the person will be active at any given minute can be predicted with greater confidence.

Analyzing a person's email reading and sending activity is useful for estimating how soon the person will read a message sent to them. This estimate can vary depending upon the time of day.

Idle period frequency data can predict within a specified degree of certainty how soon someone will return to activity, given that they have been idle for a specific period of time. Similarly, idle period frequency analysis can predict the likelihood that a person will return to activity within a specified period of time, given that they have been idle already for a specific period of time. Furthermore, idle period frequency analysis can predict a person's likely return time from lunch with greater confidence.

Activity period frequency data can predict within a specified degree of certainty how soon someone will remain active, given that they have been active for a specific period of time. Similarly, activity period frequency analysis can predict the likelihood that a person will become idle within a specified time span, given that they have been active already for a specific period of time.

By analysis of a person's past behavior before and after appointments, that person's preparation and travel buffer that they will likely use for future appointments can be predicted.

The system effectuated in one embodiment can compare two or more peoples' rhythms and their schedules for a specific day. This can be used to suggest overlapping times when both are likely to be available for mutual contact. Similarly, comparing the rhythms and schedules of a group of people can help determine an available, even optimal meeting time for the entire group.

Another use of activity history relates to an application wherein users would set periods of time during which they prefer to be or not to be contacted by others. The system uses activity history as an initial suggestion for good times to reach the user and the user chooses to accept the suggestion or to modify it. Client applications would present this information, modified by real-time presence and calendar information, to people who want to contact the recipient, Thus the system would not necessarily present the actual history of a person's presence, but that person's preferred reachability periods.

Non-Communication Applications

Besides coordinating communications, embodiments of the present invention utilizing real-time activity and/or aggregate activity information are useful for a number of time sensitive applications. One such application is the opportunity activity data accords a person to review, study, and reflect on their past activity for time management and for training therein.

Another application of one embodiment accrues to centralized computing systems, such as the SunRay™, commercially available by Sun Microsystems, Inc. of Palo Alto, Calif. Such centralized systems have many centralized resources, such as central processing units (CPU), memory, and the like. These centralized resources are shared. Further, work stations and other components of such centralized computing systems require maintenance, programming, upgrades, new installations, and the like from time to time. A person's individual activity can be analyzed to determine, for instance the optimal idle period duration after which to conduct such operations with the least possible footprint, e.g., with the lowest probability of interfering with that person's activities and hence, productivity. An embodiment of the present invention predicts when the best time is to swap a user out.

One embodiment of the present invention has health related applications. Some users of computer equipment whose activities are under analysis in the present embodiment suffer from repetitive motion injuries and stress. Such users are often counseled by physicians and/or other therapists to take regular breaks from repetitive activities such as keyboard use and to use those break times for stretching and certain exercises. These users can review their activities, as recorded by an embodiment of the present invention, to ascertain whether or not they are taking breaks frequently enough. Furthermore, the system can promulgate a notification to such users after they have been continually active at certain activities (e.g., keyboarding) for a certain period of time. This can serve as an "alarm" to remind them to take their breaks, thus reducing the probability of continued injury.

In one embodiment, an electronic calendar is augmented by the ability to set an alarm which can be used to notify a user to remind them about a specific appointment in the calendar, no matter what other activity they might then be engaged in. Such an alarm notification can be graphical, aural, or both. Whatever the sensory stimulating characteristics of the alarm, the alarm can be set to execute at a specified time interval prior to the appointment.

In one embodiment, the alarm executes at an appropriate moment within a window of time prior to the appointment. The appropriateness is determined by the user's presence and current work activity. Advantageously, this reduces the possibility that a user may miss the notification if they are not present or if they are otherwise occupied when the alarm executes, or that the alarm may execute at an inopportune moment, disrupting the person's work flow and impacting their productivity detrimentally.

In one embodiment, the alarm executes during a brief pause in the user's input device (e.g., input device 121; FIG. 1C) activity, such that the alarm will be less disruptive to that person's activity flow, and thus to their productivity. In one embodiment, if the user is not active at the beginning of the alarm window, the alarm executes as soon as the person becomes active, such that it will neither be missed, nor disrupt a person's established stream of activity and productivity. In the present embodiment, in a situation wherein the system is for some reason unable to determine the most opportune time to execute the alarm, it would fall back to triggering the alarm at a default time, such as the rigidly set predetermined time before the meeting, e.g., at the end of the alarm window period. The appropriate time to fire the notification is determined in one embodiment by ascertaining a pattern of past activity through analysis of the user's activity history.

For an exemplary user who has an appointment set 20 minutes from the present time, the notification window for this appointment is between 25 and 5 minutes prior to the appointment. In the case wherein the user has been idle and returns to activity at 20 minutes before the appointment, within the window, the system could fire the notification at this moment. However, analysis indicates that 90 percent of this person's activity periods last seven minutes or longer. In the present embodiment, the system forestalls another seven minutes before firing the notification. Thus, the notification is sent within the window; it is sent with 13 minutes remaining before the appointment commences.

Figure 16:
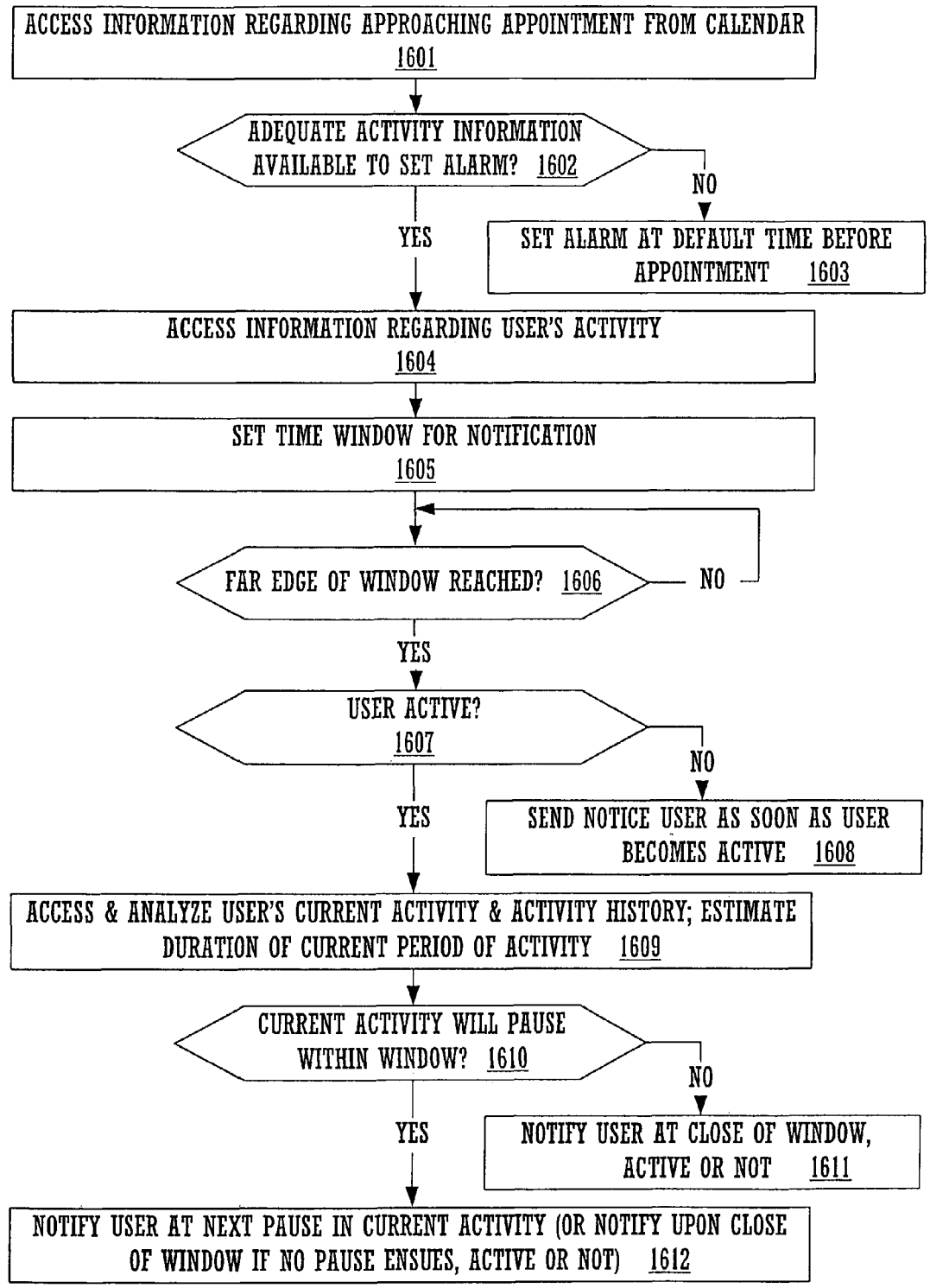
FIG. 16 is a flow chart of the steps in a process for setting an appropriate notification time, according to an embodiment of the present invention.

With reference to FIG. 16, a process 1600 effectuates appropriate timing of appointments according to one embodiment of the present invention. It is appreciated that other notifications may be similarly appropriately timed by analogous processes. Process 1600 begins with step 1601, wherein information is accessed from a person's on-line or other electronic calendar by a system (e.g. rhythm service 100; FIG. 1A, 1C) regarding an approaching time of an appointment.

In step 1602, it is determined whether adequate information is available to set the notification alarm optimally. If not, then in step 1603, the alarm is set at a default with some predetermined time remaining prior to the appointment. If it is determined that adequate information is available, then in step 1604, information regarding the user's activity is accessed.

In step 1605, a window of time appropriate for the notification is set, spanning an appropriate period prior to the appointment. It is determined then in step 1606 whether the far edge of the window has been reached. If not, then process 1600 waits until that distal edge of the window is reached.

If it is determined that the far edge of the window has been reached, then in step 1607, it is determined whether the user is active or not. If it is determined that the user is not active, then in step 1608, the appropriate moment for sending the notification is set as being as soon as it is detected that the user has returned to an active state.

If it is determined that the user is active, then in step 1609, the user's current activity is analyzed and the history of the user's activity is accessed and analyzed as well. From these analyses, the duration of the user's current period of activity is estimated.

It is determined in step 1610 whether the estimate of the duration of the user's current period of activity implies that the current period of activity will end or that a pause will ensue within the window of time for optimizing the notification. If not, then in step 1611, it is arranged to notify the user upon reaching the proximal edge of the window, e.g., upon the expiration of the window of time being reached.

If it is determined that the current period of activity will cease or pause prior to the expiration of the window of time, then in step 1612 it is arranged to notify the user at the next pause in the current period of activity, completing process 1600. It is appreciated that if the estimation of duration of the current period of activity is amiss, e.g., that the current period of activity does not cease as the window expires, then process 1600 proceeds to notify the user at the end of the window of time (e.g., step 1611), even thought the user is still active.

The present embodiment therefore effectuates a smart notification system. The system sends the notification within the specified window, and actually notifies the user of the impending appointment closer to the appointment than a simple notification would. In addition to appointment alarms, other sources of notification can be optimized by an embodiment of the present invention to be less disruptive and counterproductive. In one instance, notification of new email can be sent to a user during breaks in the user's activity, rather than immediately upon arrival of the email.

FIGS. 17 through 22 pertain to methods with which to detect and model a person's temporal activity patterns from a record of the person's computer activity or online presence. The model can then be used to predict the person's availability. The methods are both predictive and descriptive of temporal features and is constructed with a minimal amount of beforehand knowledge. A model of a person's activity rhythm is first developed and then used at a future time to predict the person's next likely time of availability with some level of confidence. Activity related data is accumulated from a mechanism that is involved in the activity of a person. Significant inactivity features are identified within the activity data. These inactivity features are characterized so as to project the temporal activity of the person. Real-time activity of the person is then detected and inactivity periods are checked for likelihood of belonging to a previously characterized significant feature. The resulting information is formatted and made available to individuals having a need for the information.

Constructing the Model

There are two major types of patterns that are of interest for the model. One type is recurring periods of inactivity. The other is recurring transitions between locations. Recurring inactivity may occur, for example, due to recurring meetings, lunch and regular breaks. Examples of location transitions may include commuting between home and office or moving between one's office and a laboratory or other site. To discover such patterns, the historical data is filtered according to factors that are likely to significantly influence rhythm, such as day of the week and location.

Figure 17:
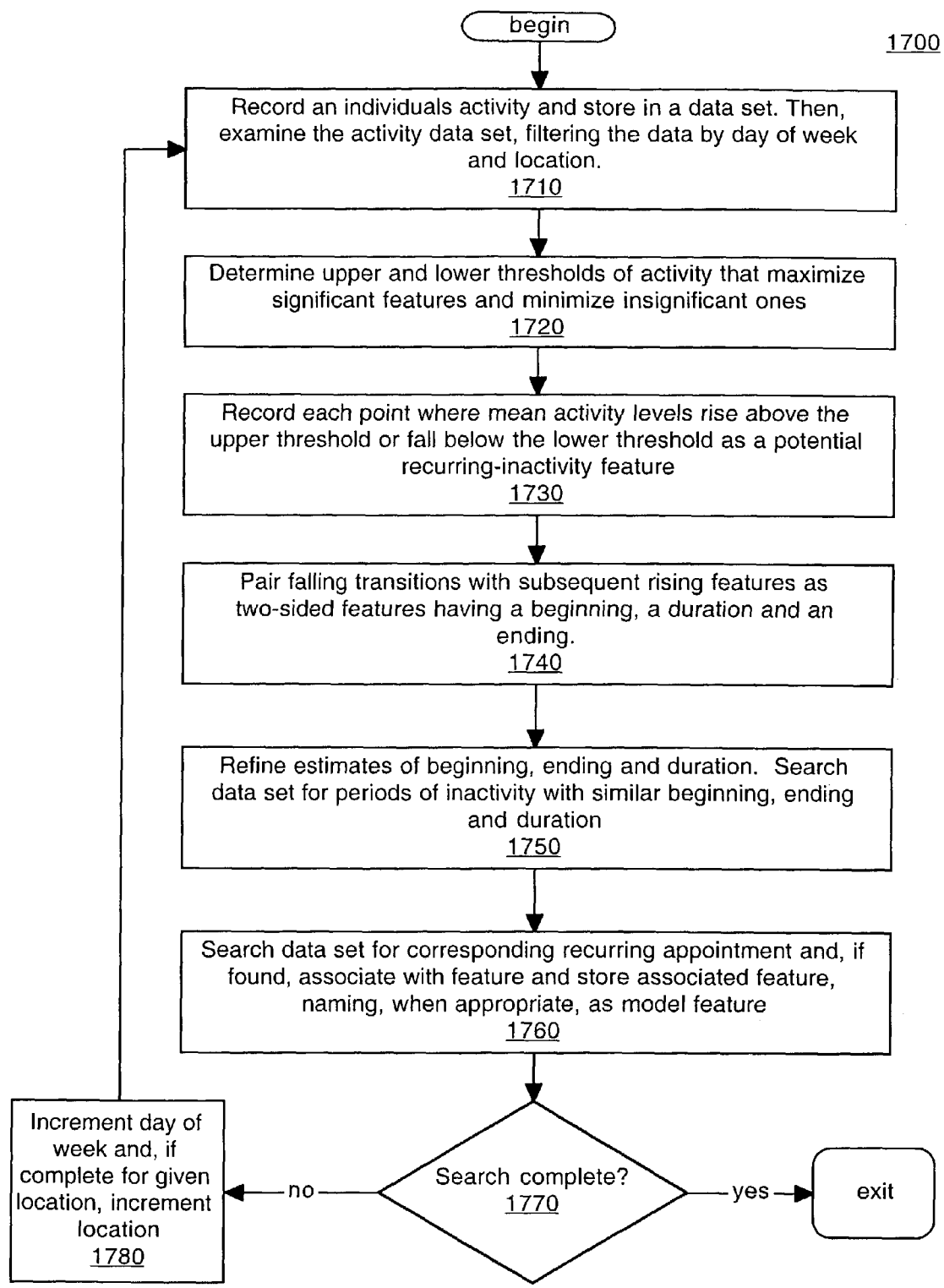
FIG. 17 is a flow chart of the steps in a computer implemented method for detecting and projecting significant features within the temporal activity of an individual, according to one embodiment of the present invention.

FIG. 17 is a flow chart 1700 of the steps in a model for detecting and projecting significant features within the temporal activity of an individual, according to one embodiment of the present invention. Although specific steps are disclosed in flowchart 1700, such steps are exemplary. That is, embodiments of the present invention are well suited to performing various other steps or variations of the steps recited in flowchart 1700. All of, or a portion of, the methods described by flowchart 1700 may be implemented using computer-readable and computer-executable instructions which reside, for example, in computer-usable media of one or more computer systems. Generally, flowchart 1700 can be implemented by rhythm service 100 of FIG. 1A.

In step 1710, an individual's activity data set is accumulated for the individual of interest, stored in computer memory and is examined periodically and updated, in accordance with one embodiment. Activity may be determined from the individual's physical state of operating an electronic device, such as typing on a keyboard, using a computer mouse, talking on the telephone, etc or by a presence sensor. For an example, an activity detection parameter may be set to define a time frame within which a keyboard or mouse is touched in order for activity to be recorded. Such an activity detection parameter may be, but is not limited to, once a minute, in which case the whole minute would be considered active. The activity detection parameter might trigger a call to a routine that would run on the frequency of the detection parameter to check whether the mouse or keyboard had been engaged since the last time it ran. The periodicity for examining the data may be, for example, once a week for each location from which the individual works and for each day of the week.

In one embodiment, the activity is collected and recorded over time for an individual and is organized in a data set or database by day of the week and by location. That is, a particular record for an individual would show his or her activity over the course of a given day for a particular location, e.g., home office, work office, lab location, etc.

Data for a given day is summarized to determine the probability that the individual is active for any given moment during that day of the week. A probability summary (FIG. 18), can then be computed.

In step 1720 of flow chart 1700 an upper and lower threshold of activity is determined, according to one embodiment of the present invention. These thresholds are applied to the probability summary and are determined in order to detect recurring inactivity patterns in a person's rhythm for a given day of the week in a given locale. The thresholds are selected so as to maximize significant inactivity features and minimize insignificant inactivity features. For further discussion of the determination of the upper and lower threshold, refer to the discussion of FIG. 18 below.

In step 1730 of FIG. 17, each point where a person's mean activity level falls below the lower threshold or rises above the upper threshold is recorded as a beginning or ending of a potential recurring-inactivity feature, according to one embodiment of the present invention. When activity is declining, it should cross the lower threshold boundary, and when activity is rising, it should cross the upper threshold boundary in order to be recorded as a falling or rising demarcation.

In step 1740, in one embodiment of the present invention, falling demarcations are paired with subsequent rising demarcations, giving rise to a feature having a starting point, a duration and an ending. There is also another type of feature of interest that is identified. This is the feature where an inactivity feature begins in one location and ends in another. The start-of-day feature has only a start-time considered and the end-of-day feature has only an end-time considered.

According to step 1740, a number of features are defined by examining the probability summary for a given day of the week and location. This can be repeated for each day of the week and for each location. The low and high thresholds can be adjusted to eliminate insubstantial features being defined.

In step 1750, according to one embodiment of the present invention, the estimates of the start, end and duration of the potential features are refined by scanning the data set information. One example of a method of refinement is described below in conjunction with FIG. 19. In this step, the data set is searched for periods of inactivity with similar characteristics, such as beginnings, endings and durations to a selected feature. Probability distribution data of the matching periods is then compiled and associated with the feature's definition.

In step 1760, the data set is searched for recurring appointments corresponding to the similar periods of inactivity from step 1750, according to one embodiment of the present invention. If a recurring appointment is found, it is associated with the inactivity feature and the feature becomes named accordingly. A naming convention may be as simple as naming a feature closest to noon as "lunch", a feature corresponding to a recurring staff meeting, as determined from, for instance, an online calendar, would be named "staff meeting", etc. A location-transition feature might be named after the locations in which it begins and ends, such as "office to lab" or "home to office". Once a feature is identified, it is stored in computer memory along with probability distributions for beginning, ending and duration, as a feature model.

In step 1770 of FIG. 17, a check is performed for whether the search is still in process or if it is complete, in accordance with one embodiment of the present invention. If still in process, the day of the week or location is incremented as indicated in step 1780, and the process repeats. Once the data search has been exhausted and all similar periods of inactivity have been characterized, the model database is complete and flow chart 1700 is exited. At the completion of 1700, multiple feature models are defined, organized by day-of-the-week and location. What follows is a pseudo example of Process 1700 and pertinent steps of process 1700 are described in more detail.

Table 1 below illustrates one example of a pseudo code that could be used for implementing the method as set forth in FIG. 17.

TABLE 1

Feature Detection
    An individual's data set is examined periodically (weekly for each day of the week) to search for Rhythm Features. The feature detection technique has several steps, illustrated by the pseudo code below.
// Detect recurring, regular periods of inactivity
// (e.g., lunch, regular breaks).
1.     For each day of the week
2.         For each location
3.             Calculate the mean activity levels throughout the day
4.             Determine upper and lower thresholds that maximize
5.                 significant features and minimize short ones
6.             Mark each point where mean activity rises above upper
7.                 threshold or drops below the lower threshold as a
8.                 potential recurring-inactivity feature
// see FIG. 18
9.             Pair falling transitions with subsequent rising
10.               transitions as two-sided features
11.            For each candidate feature
// Determine probability distribution of feature's
// start, end and duration
12.               Find the closest instance of the feature in each day
13.               If closest instance is not close enough, ignore it
14.               Calculate the probability distribution of the start,
15.                   duration, and end times
16.               Calculate the frequency of occurrence of instances of
17.                   the feature (i.e., how many days out of the total
18.                   had a close enough instance of the feature)
19.               Test for correlation between start and duration, record
20.                   correlation
21.               Search for corresponding recurring appointment and,
22.                   if found, associate the appointment with the feature
// Detect recurring location transitions (e.g., commutes).
23.             Find all instances of inactivity periods that start in one
24.               location and end in another.
25.             Calculate the probability distribution of the start,
26.               duration, and end times
Closeness in lines 12 and 13 is defined as the proportional distance from the observed start, end and duration to the estimated start, end and duration.

Figure 18:
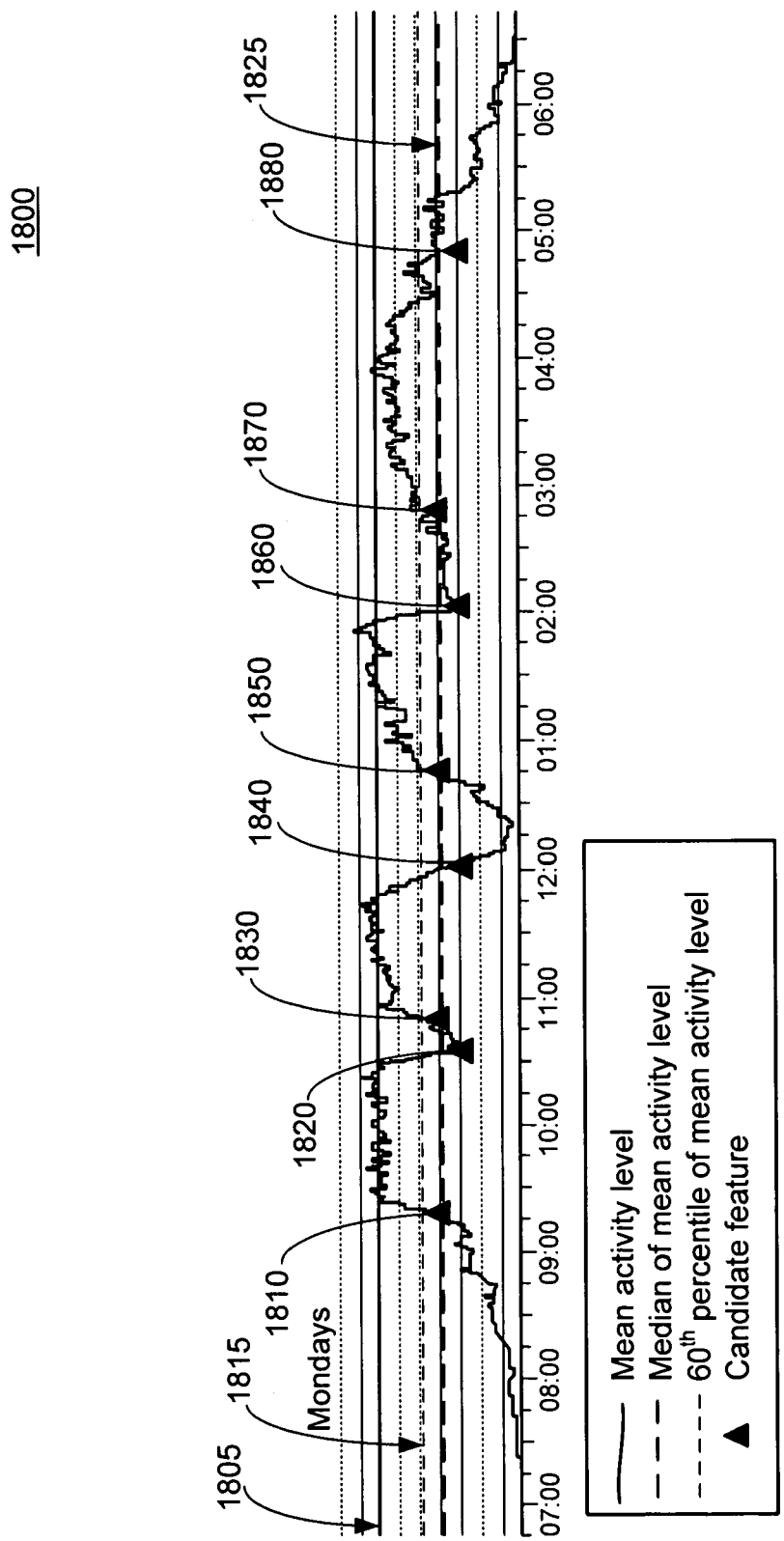
FIG. 18 is a graphical representation of an example of detecting significant features in a person's activity rhythm, according to a probability study for a specific day, in accordance with one embodiment of the present invention.

FIG. 18 is a graphical representation 1800 of an example of detecting significant features in a person's activity rhythm, in accordance with one embodiment of the present invention. The graph is a probability summary for a given day and for a given location. A mean 1805 of a person's activity level, as measured by activity at a computer, an upper threshold 1815 and a lower threshold 1825 are shown. In the example shown, upper threshold 1815 is shown as the median of mean 1805 and the lower threshold 1825 is shown to be the $60^{th}$ percentile of mean 1805. However, upper threshold 1815 and lower threshold 1825 may begin as the same value, for example, the median of the mean 1805, and then be adjusted up or down, according to the activity rhythm of the individual, so that short periods of inactivity are not selected as significant features in the person's temporal rhythm.

Once lower threshold 1825 and upper threshold 1815 are determined, the data is examined for crossings of these thresholds, and the crossings are marked as potential beginnings and endings of significant features in the person's activity pattern. These are then paired and compared to recurring inactivity periods with similar characteristics (see FIG. 19) and if found to match, used to characterize the inactivity period.

In the example shown in FIG. 18, the following candidate features are detected: (1) feature 1810, start of day (one-sided transition to active); (2) features 1820 and 1830, recurring inactivity—corresponds to recurring appointment at 10:30-11:00; (3) features 1840 and 1850, recurring activity—"lunch"; (4) features 1860 and 1870, recurring inactivity—corresponds to recurring appointment at 2:00 to 3:00; (5) feature 1880, end of day (one-sided transition to inactive). The start time and duration of the features are estimates.

Figure 19:
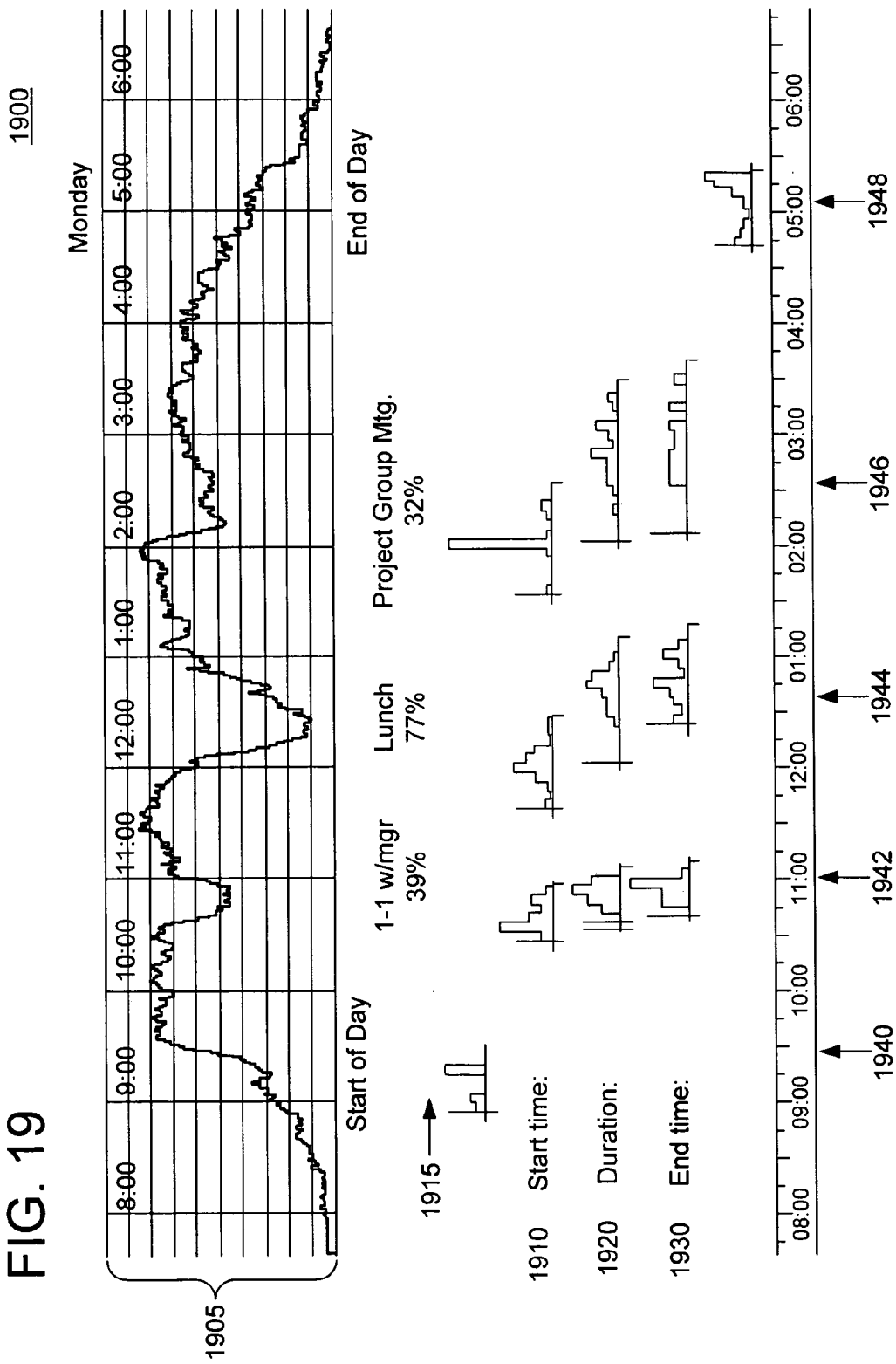
FIG. 19 is a graphical representation of a rhythm model showing an activity pattern and probability distributions of significant features used in refining the model, according to one embodiment of the present invention.

FIG. 19 is a graphical representation 1900 of a rhythm model showing an activity pattern and probability distributions of significant features used in refining the model, according to one embodiment of the present invention. The next step in the modeling includes calculating statistics on actual instances of the detected features over a number of days using the daily activity records from the data set. It should be understood that a variety of methods can be used and that the present invention is not limited to this example. For each feature and for each day, the similarity of each inactivity period from the daily recorded data in the data set to an estimated feature period is calculated. Similarity may be determined by any number of metrics such as the proportional distance of the observed start, end and duration from the estimated start, end and duration. Equation (1) below is one example of a similarity metric that describes the distance function $f$ by comparing two time periods, represented as points in three-dimensional space with start, end and duration as the axes. A lower value indicates greater similarity. It is appreciated that those skilled in the art may use any of a number of metrics to determine the similarity between time periods.

$$f = \sqrt{\left(\frac{\Delta \text{start}}{\hat{\sigma}_{start}}\right)^2 + \left(\frac{\Delta \text{end}}{\hat{\sigma}_{end}}\right)^2 + \left(\frac{\Delta \text{duration}}{\hat{\sigma}_{duration}}\right)^2} \quad (1)$$

The numerators, $\Delta$start, $\Delta$end and $\Delta$duration, of equation (1) are the absolute value of the difference between the estimated values of the feature and a specific instance of an inactivity period. Each dimension in the space is normalized by weighting the parameter by how far it can vary before significantly affecting similarity. Where $\sigma_{start}$, $\sigma_{end}$ and $\sigma_{duration}$ are the estimated standard deviations of the start and end times and duration of the rhythm feature. Although a normal distribution is not assumed, standard deviation can provide a useful measure of variance. Initial estimates may be bootstrapped manually and then refined by iterating until the proportional difference between the estimate and the refined value converges.

Still referring to FIG. 19, in one embodiment of the present invention, a predetermined value, is used as a filter to determine whether a time period from the daily recorded data of the data set is an instance of a particular rhythm feature. This value (e.g., three) allows all of a period's properties to lie within one standard deviation from the rhythm feature, or any two to lie between one and two standard deviations. From this set of instances, the periods that are potential members of the rhythm feature are identified, probability distributions are determined, statistics are calculated and the probability distribution determined for each property of the rhythm feature: start, end and duration. The percentage of days in which an instance is detected, which indicates the frequency at which instances of the feature occur, is also calculated in accordance with one embodiment of the present invention.

Still referring to FIG. 19, a graphical example 1905 of the probability summary of a person's activity during the course of a selected day is shown. Identified features 1940, 1942, 1944, 1946 and 1948 are shown. The frequency of occurrence of the identified features is displayed below the label of each feature in row 1915 of illustration 1900. Probability distributions shown in rows 1910, 1920 and 1930 represent the probability distributions for the start, duration and end times, respectively, according to one embodiment. These probability distributions are determined by calculating the frequency distributions of the start time, end time and duration of feature instances and dividing by the number of instances. The probability distributions have the same shape as the probability distributions of instances of inactivity for the time period indicated across the top of graph 1905. The probability distributions are stored along with the definition of each significant feature, and this compilation of significant features and their probability distributions, categorized by location and day of the week, comprise the model from which the nature of a person's inactivity periods can be deduced. For example, feature 1944 is called the "lunch" feature and is defined by its name and three probability distributions, start, end and duration, found in rows 1910, 1930 and 1020, respectfully. These distributions were computed by scanning the data set for activity on Mondays and examining each daily record for periods of inactivity that were similar to the start, end and duration of the feature as defined by the probability summary for Monday (FIG. 19).

Applying the Model

Now that a group of feature models are constructed, the aspect of applying the model is addressed. There is a real-time data stream of a person's keyboard or other electronic activity available and, when the person becomes inactive during one of the modeled significant features, it is desirable to project or predict, with some confidence level, that the person is engaged in one of these features. For example, if a person becomes inactive at 11:30 and they have been inactive for ten minutes, it may not be correct to predict that they are at lunch if their "lunch" has been identified as beginning at 12:05. However, if they become inactive at 12:00 and are inactive for ten minutes, then the prediction of "lunch" would be reasonable and with some degree of confidence, and a predicted return time could be identified. This type of information may be very useful for someone attempting to contact the individual.

FIG. 20 is a flow chart 2000 of the steps in a computer implemented method for detecting the real-time inactivity of an individual and determining the likelihood the person is engaged in an identified significant feature, in accordance with one embodiment of the present invention. In step 2005, for a selected weekday, an individual's activity information based on presence as detected by activity at a keyboard, cursor control device, telephone or other electronic device, etc., is collected into a database of daily activity organized by weekday. Then, following the steps of FIG. 17 above, significant features are identified in the periods of inactivity for the individual.

In step 2010, an individual's activity is monitored on a real-time basis, according to the present embodiment. There is a real-time data stream of a person's keyboard, mouse or other electronic activity that can be monitored on a periodic basis, such as once per minute. Any detected period of inactivity is recorded, and the duration of inactivity is monitored.

In step 2020, in accordance with one embodiment of the present invention, when an inquiry regarding the individual is received, any recently detected inactivity periods are determined. A duration of inactivity is reported along with the current time. From this, a start-time of inactivity can be determined.

In step 2030, according to one embodiment of the present invention, the data base containing the accumulated model information is queried for a recurring significant feature on the same day of the week and at the same time. If none is found (step 2040), then there is no identified state that the person is in and step 2045 returns a "no state" message and monitoring continues. A feature is located at step 2030 by examining the start-time of the period of inactivity (found at 2020) against the mid-point of the probability distributions of the defined features. The identified feature is then that feature having a range in which the startt-time lies, wherein the range is defined by the midpoints of the start and end probability distributions if the identified feature.

In step 2050, if a significant feature is found to occur in the same location on the same day of the week and at the same time, the likelihood that the person is engaged in the feature is determined. For this determination, the recorded data set of the individuals daily activities for the day of the week and over a period of time of recording is interrogated for inactivities that are similar to said recent periods of inactivity that are similar to the significant feature but are not instances of the significant feature. Using the similarity model discussed in conjunction with FIG. 19, the likelihood that the individual is in the identified significant feature is determined.

At step 2050, three different types of periods that have start times similar to the start time of the current inactivity period are identified: (1) those that are instances of the identified feature; (2) those that are similar to the period of inactivity of 2020, but are not instances of the feature; and (3) those that are smaller in duration than the period of 2020. Based on the numbers of these identified groups, a ratio can be computed that relates to the probability that the current period of inactivity of 2020 is in fact an instance of the identified feature. This computation is described in more detail to follow.

In step 2060, once a significant feature is identified and the likelihood that the individual is engaged in that feature is calculated, the particular significant feature and the likelihood value can be reported, e.g., in response to the inquiry.

In step 2070, a prediction that the individual is in the particular feature, based on the likelihood value, can be made. This prediction could be based on a threshold ratio value, e.g., 80%. Once the feature prediction is made, an estimate of the time the individual could be expected to return can be made based on the duration of the particular feature.

In step 2080, the expected return time may be reported, according to one embodiment of the present invention. The reporting may be in the form of a voice message in response to a phone call, an instant messaging report, a calendar entry (updating information to a more current level), an e-mail response, or any one of a variety of reporting devices available. In addition, if the data is also filtered by location, phone calls might be rerouted based on the time relative to the individual's location or deliveries of packages might be routed to home or office, etc., depending on their arrival date and time or any similar activity that would profit from the knowledge of a person's temporal rhythms.

FIG. 21 is a illustrates the determination of likelihood a person is engaged in a particular activity, according to one embodiment of the present invention. The current inactivity period 2110 is represented at the top of the diagram as a blue bar. At the time of the illustration, 12:25, the person of interest has been inactive for 10 minutes (since 12:15). The entire data set of historic inactivity periods 2120 in the vicinity (e.g., ±1σ) of the start of "lunch" (12:15) are shown below line 2115.

In the example illustrated in FIG. 21, the bars below line 2115 represent the set of instances of inactivity that started around 12:15, and the green bars represent instances that the model (see FIGS. 17-19) has inferred to be periods of "lunch". The red bars are similar to the period of inactivity, but do not meet the criteria for "lunch", so they are not considered lunches. The gray bars, such as bar 2150, are shorter than the present inactivity period, so they can be disregarded. The confidence measure is determined by the ratio of the number of green periods (those determined by the model to be instances of "lunch") to the total number of periods (that is, green plus red—the gray ones are not counted). The green bars can be determined using the similarity metric described above with respect to FIG. 17 and equation (1). Similarly, the red bars can be found as those periods that have similar start-times to the current period of inactivity, are at least as long as the current period, but are never the less not instances of the identified period.

Still referring to FIG. 21, in the illustration, there are eight (8) green bars and four (4) red bars, so 66% of the periods that are at least as long as the current inactivity period were inferred by the model to be instances of "lunch". Therefore, the current inactivity period has a 66% likelihood of being a "lunch" period. Thus, it is seen that the method uses the feature model to identify a feature for the inactivity period, but to determine the likelihood that the person is engaged in that feature, the original data set is interrogated for all instances of inactivity known to have occurred near the same time.

Once a feature of inactivity has been identified for a person, with a likelihood (confidence level), then the model can be interrogated for a duration and a prediction of a return time can be made and reported in answer to an inquiry or ad hoc to any designated destination. An example of reporting formats that might be employed is shown in FIGS. 22A and 22B.

Figure 22A:
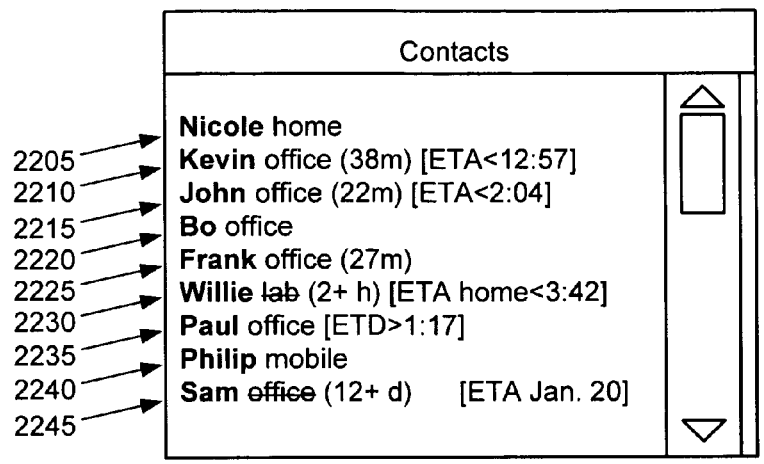
FIG. 22A illustrates one example of an instant messaging display indicating current activity of members of a distributed team, according to one embodiment of the present invention.

FIG. 22A illustrates one example of an instant messaging display 2200a indicating current activity of members of a distributed team, according to one embodiment of the present invention. Each member of the team is listed and their location and inactivity status is shown. Kevin, team member 2205, is in the office and has been inactive for 38 minutes. Kevin is expected to arrive (ETA) by 12:57. John, team member 2210, is in the office facility, and has been inactive for 22 minutes. He is expected to arrive (ETA) by 2:04. Bo, member 2215 is in the office, working on the keyboard 2217 and talking on the phone 2219. Frank, member 2220 is in the office and has been inactive electronically for 27 minutes as he is meeting with another member, shown by icon 2225. Willie, member 2230, left the lab over 2 hours ago and is expected to arrive home around 3:42. Paul, member 2235, is in the office and expected to leave as early as 1:17. Philip 2240 is on his mobile phone and Sam 2245 has been out of the office for over 12 days and is expected to return on January $20^{th}$. This is just one of a multitude of ways that the present invention can be employed to facilitate communication among members of a distributed team based on rhythm patterns as determined from electronic activity.

Figure 22B:
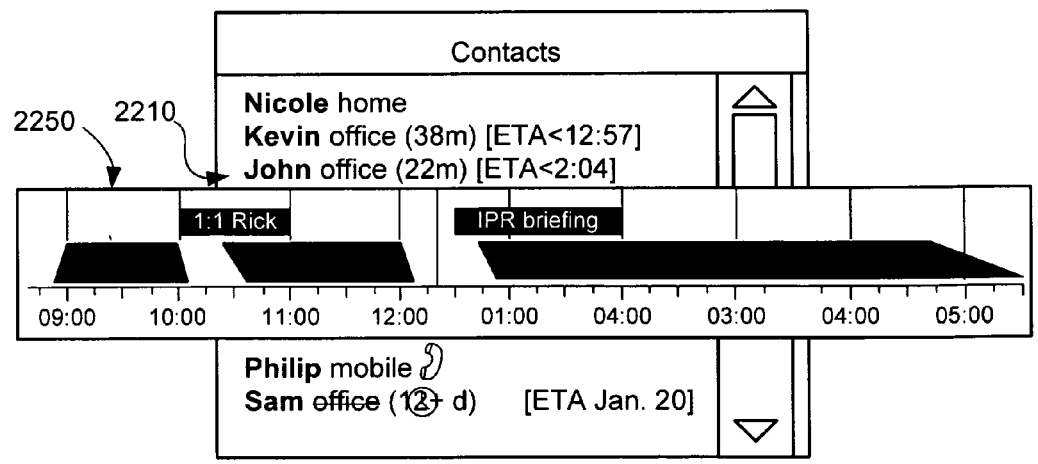
FIG. 22B illustrates an example of an instant messaging display indicating an overview of an individual's daily rhythm pattern along with current activity, in accordance with one embodiment of the present invention.

FIG. 22B illustrates an example of an instant messaging display 2200b indicating an overview of an individual's daily rhythm pattern along with current activity, in accordance with one embodiment of the present invention. In this example John 2210 has been selected, and in response to selecting him, a pop-up box 2250 is displayed revealing his rhythm patterns as extracted from the set of historical activity data for John

2210. Arrow 2255 indicates the present time as around 12:20, and it can be seen that above the pop-up box 2250 that John's estimated time of arrival (ETA) in the office is 2:04. Examining the information shown, it appears that John 2210 is attending an IPR briefing that is scheduled to last until 2:00. This is just one example of an instant messaging display that may be employed to report the information generated by the method and models of the present invention.

The preferred embodiment of the present invention, detecting and modeling temporal computer activity patterns, is thus described. While the present invention has been described in particular embodiments, it should be appreciated that the present invention should not be construed as limited by such embodiments, but rather construed according to the below claims.

What is claimed is:

1. A method, comprising operations of:
   a) accessing a database of activity data based on presence information of an individual at a location and gathered over time;
   b) for a selected weekday, computing probabilities over time that said individual is present at said location during said selected weekday;
   c) based on said probabilities, determining estimated features of inactivity that correspond to said selected weekday;
   d) searching said database for a plurality of feature instances corresponding to a first feature of said estimated features of inactivity;
   e) computing probability distributions of characteristics of said plurality of feature instances and storing, in computer memory, said probability distributions along with an identifier of said first feature as an activity rhythm model of said first feature, wherein said characteristics of said plurality of feature instances comprise a start-time, and end-time, and a duration and wherein further said probability distributions of said activity rhythm model of said first feature comprise a start-time distribution, an end-time distribution, a duration distribution, and a frequency of occurrence metric; and
   f) displaying a view in a graphical user interface in a time management application, wherein the view depends on the activity rhythm model, wherein each operation of the method is executed by a microprocessor.

2. A method as described in claim 1 wherein the view does not depend on additional input as to the characteristics from a query.

3. A method as described in claim 1 further comprising: searching said database to identify a plurality of feature instances corresponding to a second feature of said features of inactivity; and computing probability distributions of characteristics of said plurality of feature instances of said second feature and storing, in computer memory, said probability distributions of said second feature along with an identifier of said second feature as a model of said second feature.

4. A method as described in claim 1 wherein said d) comprises comparing activity data for dates corresponding to said selected weekday, to a definition of said first feature to determine a plurality of periods of inactivity that are similar to said first feature and wherein said plurality of feature instances are said plurality of periods of inactivity.

5. A method as described in claim 4 wherein said d) further comprises determining a period of inactivity as being similar to said first feature if it has characteristics that lie within a predetermined number of standard deviations from said definition of said first feature.

6. A method as described in claim 5 wherein said definition of said first feature comprises: a start-time; an end-time; and a duration.

7. A method as described in claim 1 wherein said presence information is based on periodic interaction with a keyboard at said location.

8. A method as described in claim 1 wherein said presence information is based on periodic interaction with a cursor control device at said location.

9. A method as described in claim 1 wherein said presence information is based on periodic interaction with a telephone at said location.

10. A method as described in claim 1 wherein said presence information is based on sensing by a presence sensor.

11. A method as described in claim 1 wherein said database of activity data comprises daily activity data organized by weekday and wherein, for each date, periods of activity and inactivity are recorded over time.

12. A method as described in claim 11 wherein said b) comprises:
   b1) searching said database to identify activity data for dates corresponding to said selected weekday; and
   b2) compiling said probabilities based on said activity data identified in said b1).

13. A method as described in claim 12 wherein said c) comprises:
   c1) defining high and low probability thresholds;
   c2) determining a feature of inactivity as a period having probability data that lies between said low probability threshold and said high probability threshold and wherein a start-time of said feature is defined as a transition below said low probability and wherein an end-time of said feature is defined as a transition above said high probability; and
   c3) repeating said c2) for another feature of inactivity.

14. A method as described in claim 13 wherein said c) further comprises adjusting said high and low probability thresholds to eliminate insubstantial periods of inactivity.

15. A computer-readable storage medium having stored thereon a computer program, the computer program comprising a set of instructions which when executed by a computer cause the computer to perform the operations of:
   a) accessing a database of activity data based on presence information of an individual at a location, wherein said database comprises records of daily activity data organized by weekday;
   b) examining records of said database corresponding to a selected weekday to compute probabilities over time that said individual is active at said location during said selected weekday;
   c) based on said probabilities, determining features of inactivity that correspond to said selected weekday;
   d) searching said database to identify a plurality of records that contain periods of inactivity that are similar to a first feature of said features of inactivity;
   e) computing probability distributions of characteristics of said periods of inactivity identified in said d) and storing, in said memory, said probability distributions along with an identifier of said first feature as an activity rhythm model of said first feature, wherein said characteristics of said periods of inactivity comprise a start-time, and end-time, and a duration and wherein further said probability distributions of said activity rhythm model of said first feature comprise a start-time distribution, an end-time distribution, and a duration distribution; and f) displaying a view in a graphical user interface in a time management application, wherein the view depends on the activity rhythm model.

16. A computer-readable storage medium as described in claim 15 wherein the view does not depend on additional input as to the characteristics from a query.

17. A computer-readable storage medium as described in claim 16 wherein said d) further comprises determining a period of inactivity as being similar to said first feature if it has start-time and end-time characteristics that lie within a predetermined number of standard deviations from a start-time and an end-time of said first feature.

18. A computer-readable storage medium as described in claim 16 wherein said d) further comprises determining a period of inactivity as being similar to said first feature according to a similarity metric.

19. A computer-readable storage medium as described in claim 15 wherein said presence information is based on periodic interaction with a keyboard at said location.

20. A computer-readable storage medium as described in claim 15 wherein said presence information is based on periodic interaction with a cursor control device at said location.

21. A computer-readable storage medium as described in claim 15 wherein said presence information is based on periodic interaction with a telephone at said location.

22. A computer-readable storage medium as described in claim 15 wherein each record of said database of activity data comprises activity data for a respective date and records periods of activity and inactivity over time for said respective date.

23. A computer-readable storage medium as described in claim 15 wherein said c) of said operations comprises:
   c1) defining high and low probability thresholds;
   c2) determining a feature of inactivity as a period having probability data that lies between said low probability threshold and said high probability threshold and wherein a start-time of said feature is defined as a transition below said low probability and wherein an end-time of said feature is defined as a transition above said high probability; and c3) repeating said c2) for another feature of inactivity.

24. A computer-readable storage medium as described in claim 23 wherein said c) further comprises adjusting said high and low probability thresholds to eliminate insubstantial periods of inactivity.

* * * * *